United States Patent
Gopalakrishnan et al.

(10) Patent No.: US 12,118,279 B2
(45) Date of Patent: Oct. 15, 2024

(54) LATTICE BOLTZMANN BASED SOLVER FOR HIGH SPEED FLOWS

(71) Applicant: Dassault Systemes Americas Corp., Waltham, MA (US)

(72) Inventors: Pradeep Gopalakrishnan, Woburn, MA (US); Raoyang Zhang, Burlington, MA (US); Hudong Chen, Newton, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 1009 days.

(21) Appl. No.: 16/274,403

(22) Filed: Feb. 13, 2019

(65) Prior Publication Data

US 2019/0258764 A1    Aug. 22, 2019

Related U.S. Application Data

(60) Provisional application No. 62/632,584, filed on Feb. 20, 2018.

(51) Int. Cl.
*G06F 30/25* (2020.01)
*G06F 17/11* (2006.01)
(Continued)

(52) U.S. Cl.
CPC .............. *G06F 30/25* (2020.01); *G06F 17/11* (2013.01); *G06F 30/23* (2020.01); *G06F 30/28* (2020.01);
(Continued)

(58) Field of Classification Search
CPC .......... G06F 30/28; G06F 17/11; G06F 30/20; G06F 30/15; G06F 17/5036; G06F 30/00;
(Continued)

(56) References Cited

U.S. PATENT DOCUMENTS

| 5,377,129 A | 12/1994 | Molvig |
| 5,606,517 A | 2/1997 | Traub et al. |

(Continued)

FOREIGN PATENT DOCUMENTS

| CN | 103425833 A | * 12/2013 |
| CN | 106650133 | 12/2013 |

(Continued)

OTHER PUBLICATIONS

He, Xiaoyi, Xiaowen Shan, and Gary D. Doolen. "Discrete Boltzmann equation model for nonideal gases." (American Physical Society, 1998) Physical Review E 57, No. 1. pp. R13-R16. DOI:https://doi.org/10.1103/PhysRevE.57.R13 (Year: 1998).*

(Continued)

*Primary Examiner* — Kamini S Shah
*Assistant Examiner* — Daniel E Miller
(74) *Attorney, Agent, or Firm* — Fish & Richardson P.C.

(57) ABSTRACT

Techniques for simulating fluid flow on a computer that involve a stable entropy solver are described. The techniques include simulating activity of a fluid across a mesh, the activity of the fluid being simulated so as to model movement of particles across the mesh, storing, in a computer accessible memory, a set of state vectors for each mesh location in the mesh, each of the state vectors comprising a plurality of entries that correspond to particular momentum states of possible momentum states at a corresponding mesh location, simulating a time evolution of entropy of the flow by collecting incoming set of distributions from neighboring mesh locations for the collision operation, calculating by the computer scalar values in each location, determining outgoing distributions as a product of the collision operation and addition of a heat source, and modifying the flow by the computer performing for a time interval, an advection of the particles to subsequent mesh locations.

26 Claims, 14 Drawing Sheets

(51) Int. Cl.
*G06F 30/23* (2020.01)
*G06F 30/28* (2020.01)
*G06F 30/367* (2020.01)
*G06F 111/08* (2020.01)
*G06F 111/10* (2020.01)
*G06F 113/08* (2020.01)

(52) U.S. Cl.
CPC ........ *G06F 30/367* (2020.01); *G06F 2111/08* (2020.01); *G06F 2111/10* (2020.01); *G06F 2113/08* (2020.01)

(58) Field of Classification Search
CPC .......... G06F 30/17; G06F 30/18; G06F 30/23; G06F 30/30; G06F 30/327; G06F 30/33; G06F 30/3312; G06F 30/34; G06F 30/36; G06F 30/39; G06F 30/392; G06F 30/394; G06F 30/25; G06F 30/27; G06F 2111/00–2119/22; G06F 30/367
See application file for complete search history.

(56) References Cited

U.S. PATENT DOCUMENTS

| | | | |
|---|---|---|---|
| 5,640,335 | A | 6/1997 | Molvig et al. |
| 5,848,260 | A | 12/1998 | Chen et al. |
| 5,910,902 | A | 6/1999 | Molvig et al. |
| 5,953,239 | A | 9/1999 | Teixeira et al. |
| 6,089,744 | A | 7/2000 | Chen et al. |
| 6,915,245 | B1 | 7/2005 | Hinton et al. |
| 7,209,873 | B1 | 4/2007 | Kliegel |
| 7,277,795 | B2 | 10/2007 | Boitnott |
| 7,558,714 | B2 | 7/2009 | Shan et al. |
| 8,099,265 | B2 | 1/2012 | Houston |
| 8,296,112 | B2 | 10/2012 | Tanaka |
| 8,688,414 | B2 | 4/2014 | Bornoff et al. |
| 8,970,592 | B1 | 3/2015 | Petterson |
| 9,576,087 | B2 | 2/2017 | Chen et al. |
| 2008/0126045 | A1 | 5/2008 | Shan et al. |
| 2010/0030534 | A1 | 2/2010 | Reich et al. |
| 2010/0185420 | A1 | 7/2010 | Ding |
| 2012/0296615 | A1 | 11/2012 | Shim |
| 2013/0116997 | A1 | 5/2013 | Sun et al. |
| 2013/0151221 | A1* | 6/2013 | Chen ............... G06F 30/23 703/9 |
| 2014/0257772 | A1 | 9/2014 | Perot et al. |
| 2015/0356217 | A1 | 12/2015 | Chen et al. |
| 2016/0188768 | A1* | 6/2016 | Gopalakrishnan ...... G06F 30/23 703/2 |

FOREIGN PATENT DOCUMENTS

| | | | |
|---|---|---|---|
| CN | 103425833 B | * | 2/2016 |
| EP | 1482434 | | 12/2004 |
| JP | 2010-500654 | | 1/2010 |
| JP | 2011/191848 | | 9/2011 |
| WO | WO 99/34308 | | 7/1999 |
| WO | WO 2008/021652 | | 2/2008 |
| WO | WO 2018026327 | | 2/2018 |

OTHER PUBLICATIONS

Chen, Shiyi, and Gary D. Doolen. "Lattice Boltzmann method for fluid flows." (Annual Reviews, 1998) Annual review of fluid mechanics 30, No. 1: 329-364. https://doi.org/10.1146/annurev.fluid.30.1.329 (Year: 1998).*

Gopalakrishnan, Pradeep, Yangbing Li, Raoyang Zhang, and Hudong Chen. "Computation of high-subsonic and transonic flows by a lattice Boltzmann method." (AIAA, 2016) In 54th AIAA Aerospace Sciences Meeting, AIAA SciTech Forum AIAA SciTech Forum pp. 1-15. DOI: 10.2514/6.2016-0043 (Year: 2016).*

Karlin, I. V., D. Sichau, and S. S. Chikatamarla. "Consistent two-population lattice Boltzmann model for thermal flows." (American Physical Society, 2013) Physical Review E 88, No. 6 : 063310. https://doi.org/10.1103/PhysRevE.88.063310 (Year: 2013).*

Eggels, J. G. M., and J. A. Somers. "Numerical simulation of free convective flow using the lattice-Boltzmann scheme." ( ScienceDirect, 1995) International Journal of Heat and Fluid Flow 16, No. 5 : 357-364. https://doi.org/10.1016/0142-727X(95)00052-R (Year: 1995).*

Chen, Sheng, and Manfred Krafczyk. "Entropy generation in turbulent natural convection due to internal heat generation." ( ScienceDirect, 2009) International Journal of Thermal Sciences 48, No. 10: 1978-1987. https://doi.org/10.1016/j.ijthermalsci.2009.02.012 (Year: 2009).*

He, Xiaoyi, Shiyi Chen, and Gary D. Doolen. "A novel thermal model for the lattice Boltzmann method in incompressible limit." ( Science Direct, 1998) Journal of computational physics 146, No. 1: 282-300. https://doi.org/10.1006/jcph.1998.6057 (Year: 1998).*

Brownlee, R. A., Alexander N. Gorban, and Jeremy Levesley. "Stability and stabilization of the lattice Boltzmann method." ( American Physical Society, 2007) Physical Review E 75, No. 3: 036711. <https://doi.org/10.1103/PhysRevE.75.036711> (Year: 2007).*

Gopalakrishnan, Pradeep, Yangbing Li, Raoyang Zhang, and Hudong Chen. "Computation of high-subsonic and transonic flows by a lattice Boltzmann method." (AIAA, 2016) In 54th AIAA Aerospace Sciences Meeting, p. 0043. <https://arc.aiaa.org/doi/pdf/10.2514/6.2016-0043> (Year: 2016).*

Conrad, Daniel. "A Viscosity Adaptive Lattice Boltzmann Method." PhD diss., Technische Universität Kaiserslautern, 2015. <https://kluedo.ub.uni-kl.de/frontdoor/index/index/docId/4058> (Year: 2015).*

Tiftikçi, A., et. al. "Lattice Boltzmann simulation of flow across a staggered tube bundle array." (ScienceDirect, 2016) Nuclear Engineering and Design, 300, pp. 135-148. <https://doi.org/10.1016/j.nucengdes.2016.01.020> (Year: 2016).*

Chen, Hudong, et al. "Recovery of full rotational invariance in lattice Boltzmann formulations for high Knudsen number flows." ( Science Direct, 2006) Physica A: Statistical Mechanics and its Applications 362, No. 1 : 125-131. <https://doi.org/10.1016/j.physa.2005.09.008> (Year: 2006).*

Zhang, Raoyang, et al. "A lattice Boltzmann approach for solving scalar transport equations." (Royal Society, 2011) Philosophical Transactions of the Royal Society A: Mathematical, Physical and Engineering Sciences 369, No. 1944: 2264-2273. <https://doi.org/10.1098/rsta.2011.0019> (Year: 2011).*

Jiaung, Wen-Shu, Jeng-Rong Ho, and Chun-Pao Kuo. "Lattice Boltzmann method for the heat conduction problem with phase change." Numerical Heat Transfer: Part B: Fundamentals 39, No. 2 (2001): 167-187. (Year: 2001).*

Gong, Shuai, and Ping Cheng. "A lattice Boltzmann method for simulation of liquid-vapor phase-change heat transfer." International Journal of Heat and Mass Transfer 55, No. 17-18 (2012): 4923-4927. (Year: 2012).*

Li, Qing, P. Zhou, and H. J. Yan. "Improved thermal lattice Boltzmann model for simulation of liquid-vapor phase change." Physical Review E 96, No. 6 (2017): 063303. (Year: 2017).*

Januszewski, Michal, and Marcin Kostur. "Sailfish: A flexible multi-GPU implementation of the lattice Boltzmann method." Computer Physics Communications 185, No. 9 (2014): 2350-2368. (Year: 2014).*

Lew, Phoi-Tack, Pradeep Gopalakrishnan, Damiano Casalino, Richard Shock, Yanbing Li, Raoyang Zhang, Hudong Chen, Kaveh Habibi, and Luc G. Mongeau. "An extended lattice Boltzmann methodology for high subsonic jet noise prediction." In 20th AIAA/CEAS aeroacoustics conference, p. 2755. 2014. (Year: 2014).*

Spinelli, Gregorio Gerardo, and Bayram Celik. "Conjugate Heat Transfer Computations via Lattice Boltzmann Method." JAST 10, No. 2 (2017): 49-59. (Year: 2017).*

Ran, Zheng, and Yupeng Xu. "Entropy and weak solutions in the LBGK model." arXiv preprint arXiv:0810.1562 (2008). (Year: 2008).*

Weigand, B., and A. Birkefeld. "Similarity solutions of the entropy transport equation." International journal of thermal sciences 48, No. 10 (2009): 1863-1869. (Year: 2009).*

(56) References Cited

OTHER PUBLICATIONS

Kadanoff, Leo P. "Entropy is in Flux." arXiv preprint arXiv:1403.6162 (2014). (Year: 2014).*

Márkus, Attila, and Gábor Házi. "Simulation of evaporation by an extension of the pseudopotential lattice Boltzmann method: A quantitative analysis." Physical Review E 83, No. 4 (2011): 046705. (Year: 2011).*

Yehya, Alissar, and Hassane Naji. "Thermal lattice Boltzmann simulation of entropy generation within a square enclosure for sensible and latent heat transfers." Applied Sciences 5, No. 4 (2015): 1904-1921. (Year: 2015).*

Chen, Hudong et al., "Cellular automaton formulation of passive scalar dynamics," Phys. Fluids 30 (5), May 1997, pp. 1235-1237.

Chen, Hudong et al., "Digital Physics Approach to Computational Fluid Dynamics: Some Basic Theoretical Features," International Journal of Modern Physics, 8, 4, (1997), 20 pages.

Chen, Hudong et al., "Extended-Boltzmann Kinetic Equation for Turbulent Flows," Science, vol. 301, No. 5633 (2003), pp. 633-636.

Chen, Hudong et al., "H-theorem and origins of instability in thermal lattice Boltzmann models," Computer Physics Communications 129 (2000), pp. 21-31.

Chen, Shiyi et al., "Lattice Boltzmann Method for Fluid Flows," Annual Review, Fluid Mech. 1998, 30: 329-364.

Clever, R.M., et al., "Transition to time-dependent convection," J. Fluid Mech. (1974), vol. 65, part 4, pp. 625-645.

He, Xiaoyi et al., "Lattice Boltzmann method on curvilinear coordinate system: Vortex shedding behind a circular cylinder," Physical Review E, vol. 56, No. 1, Jul. 1997, pp. 434-440.

International Search Report & Written Opinion, PCT/US2012/40121, Aug. 17, 2012, 12 pages.

Li, Yanbing et al., "Numerical study of flow past an impulsively started cylinder by the lattice-Boltzmann method," J. Fluid Mech. (2004), vol. 59, pp. 273-300.

Li, Yanbing et al., "Prediction of vortex shedding from a circular cylinder using a volumetric Lattice-Boltzmann boundary approach," Eur. Phys. J. Special Topics 171, (2009), pp. 91-97.

Parmigiani, Andrea, "Lattic Boltzmann Calculations of Reactive Multiphase Flows in Porous Media," PhD Thesis, University of Geneva, Published 2010, pp. 1, 3-4, 8-14, 18-19, 25, 27, 29, 38, 45-46, 52, 55-58, 73-74, 81, 86, 117.

Peng, Y. et al., "A 3D incompressible thermal lattice Boltzmann model and its application to simulate natural convection in a cubic cavity," Journal of Computational Physics 193 (2003), pp. 260-274.

Shan, Xiaowen, "Simulation of Rayleigh-Benard convection using a lattice Boltzmann method," Physical Review E, vol. 55, No. 3, Mar. 1997, pp. 2780-2788.

Waterson, N.P., et al., "Design principles for bounded higher-order convection schemes—a unified approach," Journal of Computational Physics 224 (2007), pp. 182-207.

Zhang, Raoyang et al., "A Lattice Boltzmann method for simulations of liquid-vapor thermal flows," Phys. Rev. E 67 066711 (2003), 19 pages.

Zhang, Raoyang et al., "Efficient kinetic method for fluid simulation beyond the Navier-Stokes equation," Phys. Rev, E 74, 046703 (2006), 7 pages.

Ladd, A.J.C. and R. Verberg, "Lattice-Boltzmann simulations of particle-fluid suspensions." Journal of Statistical Physics 104, No. 5-6 (2001), pp. 1191-1251.

Latt, Jonas, and Bastien Chopard, "Lattice Boltzmann method with regularized pre-collision distribution functions." Mathematics and Computers in Simulation 72, No. 2 (2006), pp. 165-168.

Nourgaliev, R. Robert, Truc-Nam Dinh, Theo G. Theofanous, and D. Joseph, "The lattice Boltzmann equation method: theoretical interpretation, numerics and implications." International Journal of Multiphase Flow 29, No. 1 (2003), pp. 117-169.

Larina et al., "Non-Linear Non-equilibrium Kinetic Model of the Boltzmann Equation for Monotonic Gases." Computational Mathematics and Mathematical Physics, 2011, vol. 51, No. 11, (2011), pp. 1962-1972.

International Search Report/Written Opinion in PCT/US2014/048004 mailed Oct. 27, 2014, 14 pages.

Inamuro at al.; "A Galilean invariant model of the lattice Boltzmann method for multiphase fluid flows using free-energy approach", Computer Physics Communications 129 (2000) pp. 32-45.

Nie et al. "Galilean invariance of lattice Boltzmann models", EPLA, Feb. 2008, pp. 1-6.

Allahyarov et al.; "Mesoscopic Solvent Simulations: Multiparticle-Collision Dynamics of Three-Dimensinal Flows"; Physical Review E. Statistical Physics, vol. 66, No. 3, Sep. 2002; 10 pages.

Joshi, et al.; "Lattice Boltzmann Method for Multi-Component, Non-Continuum Mass Diffusion"; Journal of Physics D: Applied Physics; vol. 40, No. 23; Dec. 7, 2007; pp. 7593-7600.

Supplemental European Search Report; EP 14 82 8815; Feb. 15, 2017; 6 pages.

International Search Report and Written Opinion; PCT/US2014/049129; Nov. 17, 2014; 6 pp.

Supplemental European Search Report: EP Appln. No. 14832274.6; Apr. 3, 2017; 7 pages.

Petkov et al.; "Efficient LBM Visual Simulation on Face-Centered Cubic Lattices"; IEEE Transactions on Visualization and Computer Graphics; vol. 15, No. 5; Sep. 1, 2009; 13 pages.

Han et al.; "Modelling of thermal contact resistance within ghe framework of the thermal lattice Boltzmann method"; International Journal of Thermal Sciences, vol. 47, No. 10; Oct. 1, 2008; pp. 1276-1283.

Chatterjee et al.; "A hybrid lattice Boltzmann model for solid-liquid phase transition in presence of fluid flow"; Department of Mechanical Engineering, Physics Letters A; vol. 351, No. 4-5; Mar. 6, 2006; pp. 359-367.

Raabe, "Overview of the lattice Boltzmann method for nano- and microscale fluid dynamics in materials science and engineering"; Institute of Physics Publishing, Modelling and Simulation Materials Science and Engineering; vol. 12, No. 6; Nov. 1, 2004; pp. R13-R46.

Zhang, "A lattice Boltzmann approach for solving scalar transport equations," Phil. Trans. R. Soc. A (2011), 369, (doi: 10.1098/rsta.2011.0019), pp. 2264-2273.

Nourgaliev et al., "The lattice Boltzmann equation method: theoretical interpretation, numerics and implications," International Journal of Multiphase Flow 29 (2003), pp. 117-169.

Karsch, "Lattice simulations of the thermodynamics of strongly interacting elementary particles and the exploration of new phases of matter in relativistic heavy ion collisions," J. Phys.: Conf. Ser. 46 (2006), pp. 122-131.

Nie et al., "Lattice-Boltzmann/Finite-Difference Hybrid Simulation of Transonic Flow," $47^{th}$ AIAA Aerospace Sciences Meeting, (2009), p. 1-8.

Banda et al., "A lattice-Boltzmann relaxation scheme for coupled convection-radiation systems," Journal of Computational Physics 226 (2007), p. 1408-1431.

European Search Report, EP 19 15 8256, Jul. 15, 2019.

Office Action in Chinese Appln. No. 201910126500.2, mailed on Dec. 21, 2023, 15 pages (with English translation).

Huang et al., "Research on Real-time Measurement of Contact Angle Based on Lattice Boltzmann Method," Journal of Guangxi Normal University (Natural Science), Jan. 2018, 36(1):34-43 (with English abstract).

Kou et al., "Numerical simulation of flow around multi-type obstacles by the lattice Boltzmann method," Journal of Tianjin University of Technology, Apr. 2015, 31(2):1-9 (with English abstract).

Shao et al., "Characteristic Boundary Condition in Lattice Boltzmann Method," Journal of Engineering Thermophysics, Feb. 15, 2018, 39(2):277-284 (with English abstract).

* cited by examiner

```
┌─────────────────────────────────────────────────────────────┐
│ collect an incoming set of distributions from neighboring first mesh │
│           locations from the collision operation 52         │
└─────────────────────────────────────────────────────────────┘
                              ↓
┌─────────────────────────────────────────────────────────────┐
│ collect entropy terms from second, additional set of lattice vectors │
│                that represents entropy 54                   │
└─────────────────────────────────────────────────────────────┘
                              ↓
┌─────────────────────────────────────────────────────────────┐
│      calculate a set of scalar values in each location in the mesh 56 │
└─────────────────────────────────────────────────────────────┘
                              ↓
┌─────────────────────────────────────────────────────────────┐
│    determine outgoing distributions as a product of the collision │
│              operation and an additional source 58          │
└─────────────────────────────────────────────────────────────┘
                              ↓
┌─────────────────────────────────────────────────────────────┐
│   calculate higher order error terms from incoming lattice set vectors │
│                              60                             │
└─────────────────────────────────────────────────────────────┘
                              ↓
┌─────────────────────────────────────────────────────────────┐
│    subtract corresponding average values from the normal collision │
│                        operator. 62                         │
└─────────────────────────────────────────────────────────────┘
                              ↓
┌─────────────────────────────────────────────────────────────┐
│                compute additional source term 64            │
└─────────────────────────────────────────────────────────────┘
                              ↓
┌─────────────────────────────────────────────────────────────┐
│         additional source term is added to second states 66 │
└─────────────────────────────────────────────────────────────┘
                              ↓
┌─────────────────────────────────────────────────────────────┐
│  entropy diffusion is calculated and a result of the calculated │
│        entropy diffusion is removed from the source term 68 │
└─────────────────────────────────────────────────────────────┘
                              ↓
┌─────────────────────────────────────────────────────────────┐
│ Advection of particles to next first mesh locations and advection of │
│      calculated entropy to next second mesh locations 46c   │
└─────────────────────────────────────────────────────────────┘
```

FIG. 3

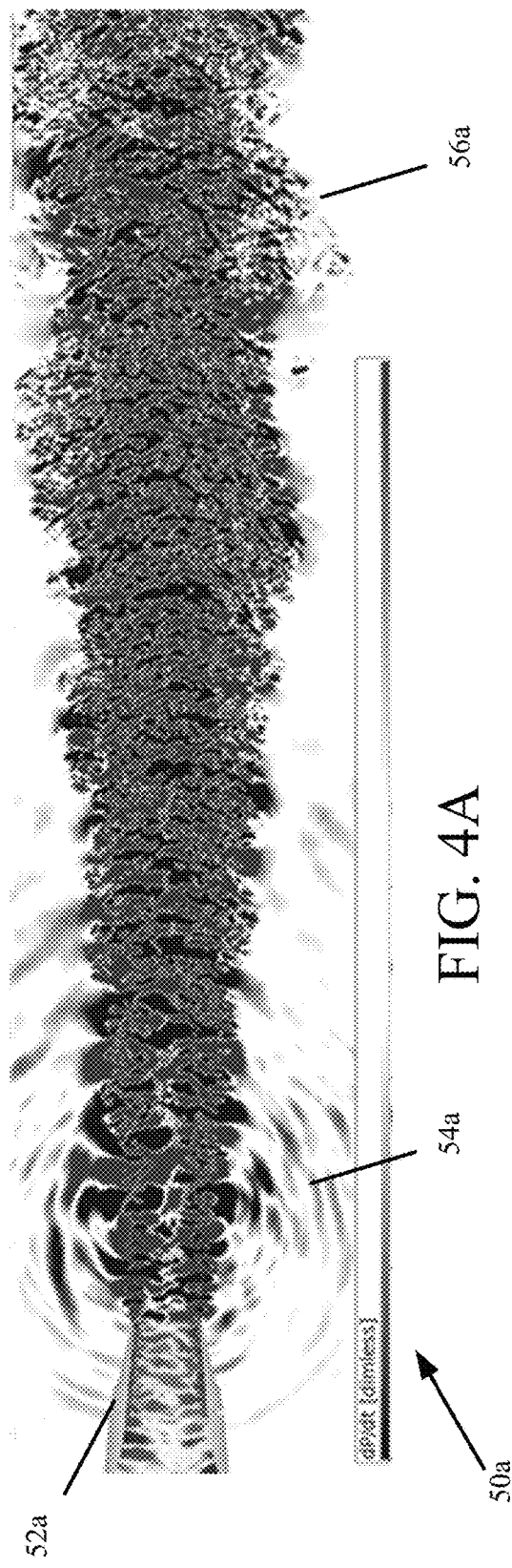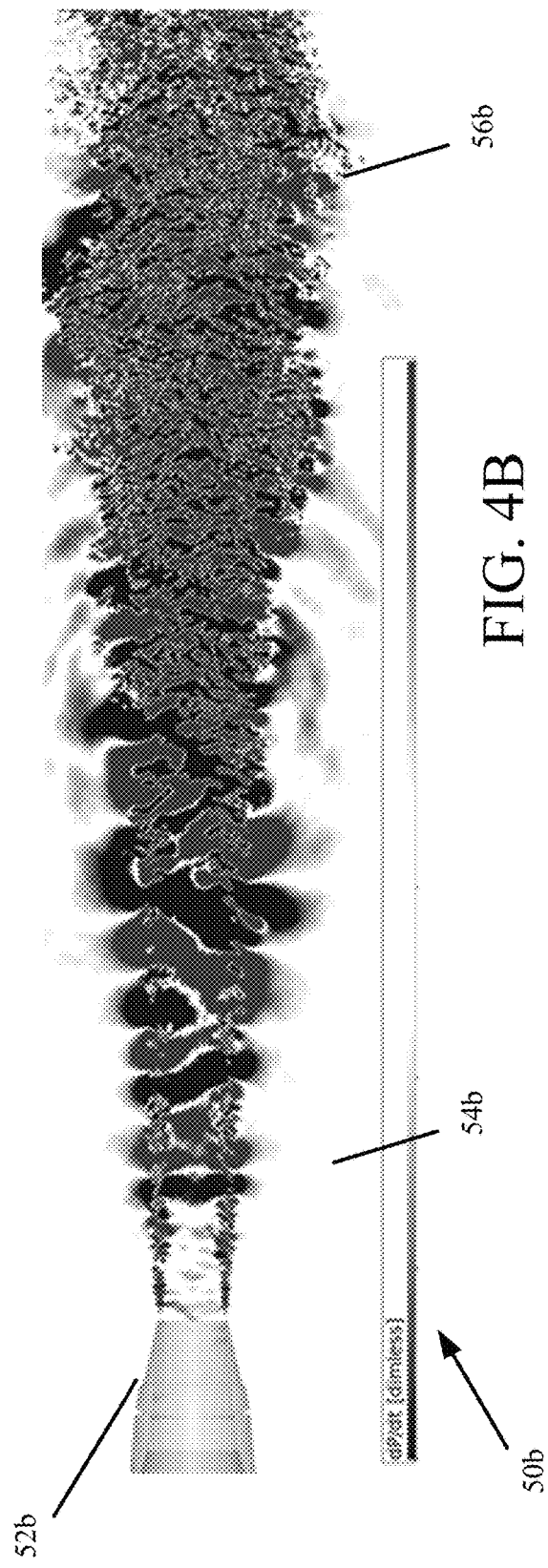

LATTICE BOLTZMANN BASED SOLVER FOR HIGH SPEED FLOWS

CLAIM OF PRIORITY UNDER 35 U.S.C. § 119

This application claims priority under 35 U.S.C. § 119 to U.S. Provisional Patent Application Ser. No. 62/632,584, filed Feb. 20, 2018, and entitled "Lattice Boltzmann based solver for high speed flows", the entire contents of which is incorporated herein by reference.

BACKGROUND

Lattice Boltzmann methods (LBM) is a class of computational fluid dynamics (CFD) methods for fluid simulation. Instead of solving the Navier-Stokes equations, the discrete Boltzmann equation is solved to simulate the flow of a Newtonian fluid with collision models such as Bhatnagar-Gross-Krook (BGK). By simulating streaming and collision processes across a limited number of particles, the intrinsic particle interactions evince a microcosm of viscous flow behavior applicable across the greater mass.

SUMMARY

According to an aspect, a method for simulating fluid flow on a computer includes simulating activity of a fluid across a mesh, the activity of the fluid being simulated so as to model movement of particles across the mesh, storing, in a computer accessible memory, a set of state vectors for each mesh location in the mesh, each of the state vectors comprising a plurality of entries that correspond to particular momentum states of possible momentum states at a corresponding mesh location, simulating a time evolution of entropy of the flow by collecting incoming set of distributions from neighboring mesh locations for the collision operation, calculating by the computer scalar values in each location, determining outgoing distributions as a product of the collision operation and addition of a heat source, and modifying the flow by the computer performing for a time interval, an advection of the particles to subsequent mesh locations.

One or more of the following features may be included in the above aspect.

Simulating activity of the fluid flow includes simulating the fluid flow based in part on a first set of discrete lattice speeds, and the method further includes simulating time evolution of the entropy quantity, based in part on a second set of discrete lattice speeds. The second set of discrete lattice speeds are the same lattice speeds as the first set of discrete lattice speeds. The method further includes calculating by the computer, higher order error terms from incoming lattice set vectors, determining average values of the higher order error terms, and subtracting the average values of the higher order error terms from the collision operator. The additional heat source is computed and added to the second states, and the method further includes calculating by the computer, the effect of heating by fluid viscosity and heating by fluid conduction and calculating by the computer, the entropy diffusion and removing this from the additional heat source. The method further includes calculating by the computer, a set of physical quantities for the mesh locations in the mesh. The method provides a Lattice Boltzmann entropy solver that avoids a second order velocity term. The collision operator involves a non-equilibrium computation without any second order terms in velocity. The method further includes solving for entropy by providing an additional set of lattice vectors, $q_i$, to represent the specific entropy, s, and with the time evolution of those states being given by $$q_i(x + c_i \Delta t, t + \Delta t) = q_i^{eq}(x, t) + \left(1 - \frac{1}{\tau_q}\right)\left[\left(\frac{c_i - V}{p}\right) \cdot \overset{\vee non\text{-}eq}{\Pi_q}\right] + Q_s,$$

where $q_i$ are lattice vectors, x is direction $c_i$ is velocity of states, $\Delta t$ is a change in time t, $q_j^{eq}(x, t)$ is lattice vectors at equilibrium, $\tau_q$ is the relaxation time, V is $\Pi_q^{noneq}$ is the non-equilibrium contribution, p is pressure, and $Q_s$ is the additional heat source. The method wherein the collision operator is related to:

$$\overset{\vee non\text{-}eq}{\Pi_q}\left(\delta - \frac{vv}{RT + v^2}\right) \cdot \Pi_q^{non\text{-}eq}.$$

Other aspects include computer program products and apparatuses such as computers and data processing systems.

One or more of the above aspects may provide one or more of the following advantages. The entropy solver avoids a (ρvv), term that otherwise introduces an error, e.g., instability in particular for high speed flows as that term is proportional to Ma² (speed squared). The entropy solver thus is stable for high speed applications. In the context of a Lattice Boltzmann approach, an LB based entropy solver is effective for solving high speed applications that require highly accurate transient results along with compressibility effects. Applications with high temperature ratio also benefits from the LB entropy solver due to enhanced stability offered by its unique collision model.

BRIEF DESCRIPTION OF THE DRAWINGS

FIG. 3 depicts a flow chart showing simulation operations using the Lattice Boltzmann model with the entropy solver.

FIGS. 4A, 4B depict simulated flows for fluid dynamic and Lattice Boltzmann based techniques, respectively.

Figure 1:
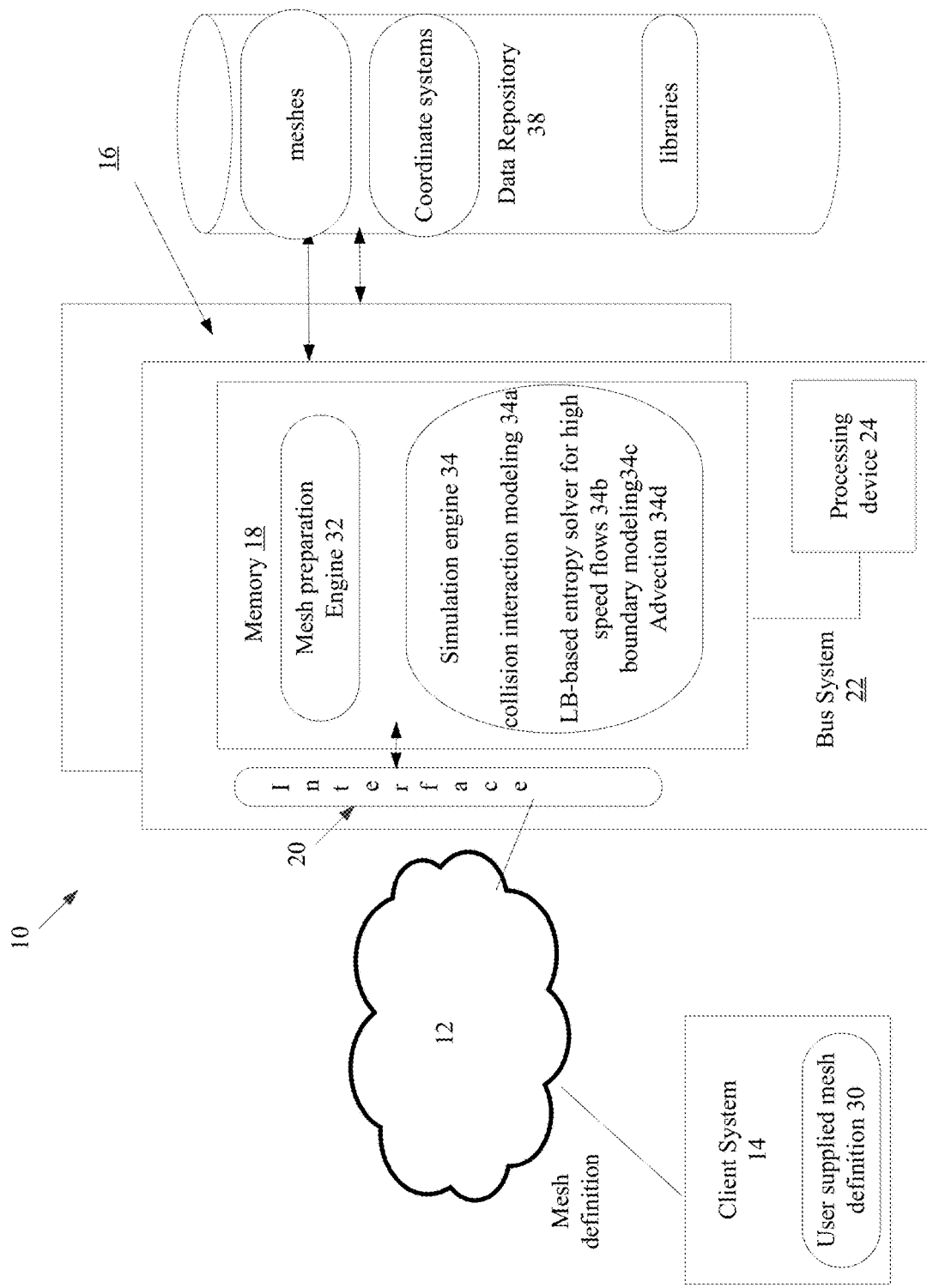
FIG. 1 depicts a system for simulation of fluid flows, which includes an entropy solver for compressible flows.

The details of one or more embodiments of the invention are set forth in the accompanying drawings and the description below. Other features, objects, and advantages of the invention are apparent from the description and drawings, and from the claims.

DETAILED DESCRIPTION

One method for simulating fluid flows is the so called the Lattice Boltzmann Model (LBM). In a LBM-based physical process simulation system, fluid flow is represented by distribution function values, evaluated at a set of discrete velocities using the well-known lattice Boltzmann equation (see Eq. 1 below) that describes the time-evolution of the distribution function. The distribution function involves two processes a streaming process to and a collision process.

$$f_i(x + c_i \Delta t, t + \Delta t) = f_i(x, t) - \frac{1}{\tau}[f_i(x, t) - f_i^{eq}(x, t)] \quad \text{(Eq. 1)}$$

$$f_i^{eq} = \rho \omega_i \left[ 1 + (\xi \cdot u) + \frac{(\xi \cdot u)^2 - u^2}{2} + (\xi \cdot u)\frac{(\xi \cdot u)^2 - 3u^2}{6} \right] \quad \text{(Eq. 2)}$$

where $\xi$, and u, are, respectively, a non-dimensional lattice vector and velocity and where $f_i(x, t)$ is the particle distribution function along the lattice direction $c_i$ at location x at time t, with $f_i^{eq}$ being the equilibrium distribution, and $\tau$ being a characteristic relaxation time.

The streaming process is when a pocket of fluid starts out at a mesh location, and then moves along one of the velocity vectors to the next mesh location. At that point, the "collision factor," i.e., the effect of nearby pockets of fluid on the starting pocket of fluid, is calculated. The fluid can only move to another mesh location, so the proper choice of the velocity vectors is necessary so that all the components of all velocities are multiples of a common speed.

The right-hand side of the first equation is the aforementioned "collision operator" that represents the change of the distribution function due to the collisions among the pockets of fluids. The particular form of the collision operator is the Bhatnagar, Gross and Krook (BGK) operator. The collision operator forces the distribution function to go to the prescribed values given by the second equation, which is the "equilibrium" form.

The BGK operator is constructed such that the distribution function approaches a well-defined local equilibrium, irrespective of the details of the collisions, according to $\{f_i^{eq}(x, v, t)\}$:

$$C = -\frac{1}{\tau}(f - f^{eq}),$$

where the parameter $\tau$ represents the characteristic relaxation time to equilibrium via collisions. Dealing with particles (e.g., atoms or molecules) the relaxation time is typically taken as a constant.

From this simulation, conventional fluid variables, such as mass $\rho$ and fluid velocity u, are obtained as simple summations of Eq. 2.

$$\rho(x,t) = \Sigma_i f_i(x,t); \rho u(x,t) = \Sigma_i c_i f_i(x,t); \quad \text{(Eq. 3)}$$

where $\rho$, and u, are, respectively, the fluid density, velocity, mentioned above.

Due to symmetry considerations, the set of velocity values are selected in such a way that they form certain lattice structures when spanned in the configuration space. The dynamics of such discrete systems obeys the Lattice Boltzmann equation (LBE) having the form $$f_i(x+c_i\Delta t, t+\Delta t) - f_i(x,t) = C_i(x,t)$$

where the collision operator usually takes the BGK form, as described above.

By proper choice of the equilibrium distribution forms, it can be theoretically shown that the Lattice Boltzmann Equation gives rise to correct hydrodynamics. That is, the hydrodynamic moments derived from $f_i(x, t)$ obey the Navier-Stokes equations in the macroscopic limit. These moments are defined by Equation (3) above.

The collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken. In a fluid system, a small disturbance of the density travels at the speed of sound. In a gas system, the speed of sound is generally determined by the temperature. The importance of the effect of compressibility in a flow is measured by the ratio of the characteristic velocity and the sound speed, which is known as the Mach number. For a further explanation of conventional LBM-based physical process simulation systems the reading is referred to the above incorporated by reference application US-2016-0188768-A1.

Thermal Lattice Boltzmann Model

The LBM described by Eq. 1 and Eq. 2 is only applicable for solving low speed flows with uniform temperature. For thermal flows, it is customary to introduce a separate solver to solve energy equation and the computed temperature is coupled back into lattice Boltzmann method. The temperature equation can either be solved by finite difference method or by introducing additional set of lattice vectors.

A unique LBM based temperature solver is employed. In this LBM based temperature solver, an additional set of lattice vectors are used to represent a specific scalar, i.e., temperature that accompanies the flow vector and moves from one mesh point to another. It has several advantages and more detailed description is available in published patent application US 20130151221 A1, the entire contents of which are incorporated herein by reference.

A similar transport mechanism is used herein for an entropy solver, discussed below.

Once the temperature is known, the temperature is coupled with a fluid LBM solver. Traditional methods employ the following equilibrium distribution (Eq. 4) for thermal flows, in the time evolution of LBM (Eq. 1).

$$f_i^{eq} = \rho \omega_i \left[ 1 + (\xi \cdot u) + \frac{(\xi \cdot u)^2 - u^2}{2} + \frac{(\theta - 1)}{2}(\xi^2 - D) + \right. \quad \text{(Eq. 4)}$$

$$\left. (\xi \cdot u)\frac{(\xi \cdot u)^2 - 3u^2}{6} + \frac{(\theta - 1)}{2}(\xi \cdot u)(\xi^2 - D - 2) \right]$$

where $\xi$, u, and, $\theta$, are, respectively, non-dimensional lattice vector, non-dimensional velocity and non-dimensional pressure. However, for high temperature ratio applications, the term, θ−1, will become negative that makes the solver become unstable.

Specific details of a coupling technique that makes the equilibrium distribution positive during the collision for a relatively wide range of flow conditions is detailed in co-pending US Patent Publication US-2016-0188768-A1, by Pradeep Gopalakrishnan, et al. entitled: "Temperature Coupling Algorithm for Hybrid Thermal Lattice Boltzmann Method," the entire contents of which are incorporated herein by reference.

The BGK collision operator set out in Eq. 1 has a relatively low stability range. While the operator of Eq. 1 is useful for low Mach (Mach <0.6) and low temperature ratio applications, that operator of Eq. 1 tends to become unstable at higher Mach (Mach >0.6) and higher temperature ratio applications. A temperature solver applicable for high subsonic and transonic applications in the field of aerospace, necessitates a more stable collision operator that is based on Galilean-invariant operator that has a relatively high stability range. Specific details of such a collision operator are detailed in U.S. Pat. No. 9,576,087, the entire contents of which are incorporated herein by reference.

Energy Conservation for High Speed Compressible Flows

For high speed flows, particularly flows with Mach number above 0.3, the effects on energy of the fluid due to compressibility and heating changing viscosity of the fluid are not negligible. The energy equation for compressible flows, given by Eq. 5, accounts for this compressibility effect.

$$\frac{\delta(\rho e)}{\delta t} + \nabla \cdot [(\rho e V)] + p[\nabla \cdot V] = \nabla \cdot [k \nabla T] + \Phi \quad \text{(Eq. 5)}$$

where e is internal energy, V is velocity, k is thermal conductivity, and Φ is the dissipation function, representing the rate at which mechanical energy turns into thermal energy due to viscosity. For incompressible flows, the pressure work term, third term on the left hand side of equation 5 and viscous dissipation term drops out and Eq. 5 turns into a typical convection-diffusion scalar equation that is relatively easy to solve.

However, solving Eq. 5 in its entirety using a finite difference approach or other approaches results in instability due to the presence of a divergent velocity term. In order to avoid this term, energy conservation is enforced by a more viable option, i.e., by solving an entropy equation (Eq. 6), given below:

$$\frac{\partial(\rho s)}{\partial t} + \nabla \cdot (V \rho s) = \frac{\nabla \cdot (k \nabla T) + \Phi}{T} \quad \text{(Eq. 6)}$$

where s is the entropy of the system.

Lattice Boltzmann Based Entropy Solver for Compressible Flows

The entropy equation, Eq. 6, can be solved using traditional methods like finite volume or finite difference methods. For complex problems, the mesh has multiple levels of resolution and has complex boundary conditions. The traditional methods have difficulties in computing gradients for these situations, which introduces strong mesh dependencies and numerical artifacts.

Described herein is a Lattice Boltzmann (LB) based entropy solver 34b (FIG. 1) that can deal with these complex problems. Solving for entropy uses an additional, second set of lattice vectors, $q_i$, which are introduced to represent the specific entropy "s." The time evolution of those states is given by:

$$q_i(x + c_i \Delta t, t + \Delta t) = q_i^{eq}(x, t) + \left(1 - \frac{1}{\tau_q}\right)\left[\left(\frac{c_i - V}{p}\right) \cdot \Pi_q^{noneq}\right] + Q_s \quad \text{(Eq. 7)}$$

where p is pressure, and $Q_s$ is an additional source, e.g., an additional heat source. Eq. 7 along with Eq. 1 carries the entropy term from one mesh point to another mesh point, and an entropy conservation equation (Eq. 8) is obtained as a product of the two equations.

$$S = \rho s = \sum_i f_i q_i \quad \text{(Eq. 8)}$$

where S is the total entropy. This approach transports total entropy as a scalar term on a flow that is advected, similar to the mechanism employed for the LBM based temperature solver, as described in US Patent Publication US-2016-0188768-A1. There are several advantageous to this approach for transport of entropy, including a relatively smooth transition near different mesh levels and near complex boundaries.

The second term on the right hand side of Eq. 7 is the so called regularized collision operator. In the BGK collision operator, (given by Eq. 1), the difference between the actual state and equilibrium state, known as the "non-equilibrium part" is computed. This non-equilibrium part is relaxed so that the actual state will relax to the equilibrium state.

However, that operator involves all orders of non-equilibrium effects, which is unnecessary for conservation. In addition, involving all orders of the non-equilibrium effects may result in instability. The operator used in Eq. 7, on the other hand, only takes first order effects (first order moment computed by multiplying with lattice vector) of the non-equilibrium contribution into consideration, as follows:

$$\Pi_q^{noneq} = \sum_i c_i [f_i(x,t) q_i(x,t) - f_i(x,t) s] \quad \text{(Eq. 9)}$$

This filtered non-equilibrium part is then multiplied by Galilean invariant operator $c_i - V$.

Referring now to FIG. 1, a system 10 that includes a LB-based entropy solver 34b for high speed and compressible flows is described. The system 10 in this implementation is based on a client-server or cloud based architecture and includes a server system 12 implemented as a massively parallel computing system 16 (stand alone or cloud-based) and a client system 14. The server system 12 includes memory 18, a bus system 22, interfaces 20 (e.g., user interfaces/network interfaces/display or monitor interfaces, etc.) and a processing device 24. In memory 18 are a mesh preparation engine 32 and a simulation engine 34.

While FIG. 1 shows the mesh preparation engine 32 in memory 18, the mesh preparation engine can be a third party application that is executed on a different system than server 12. Whether the mesh preparation engine 32 executes in memory 18 or is executed on a different system than server 12, the mesh preparation engine 32 receives a user-supplied mesh definition 30 and the mesh preparation engine 32 prepares a mesh and sends (and or stores) the prepared mesh to the simulation engine 34. The simulation engine 34 includes collision interaction module 34a, a LB-based solver module for high speed flows 34b, boundary module 34c and advection particle collision interaction module 34d. The system 10 accesses a data repository 38 that stores 2D and/or 3D meshes (Cartesian and/or curvilinear), coordinate systems, and libraries.

Figure 2:
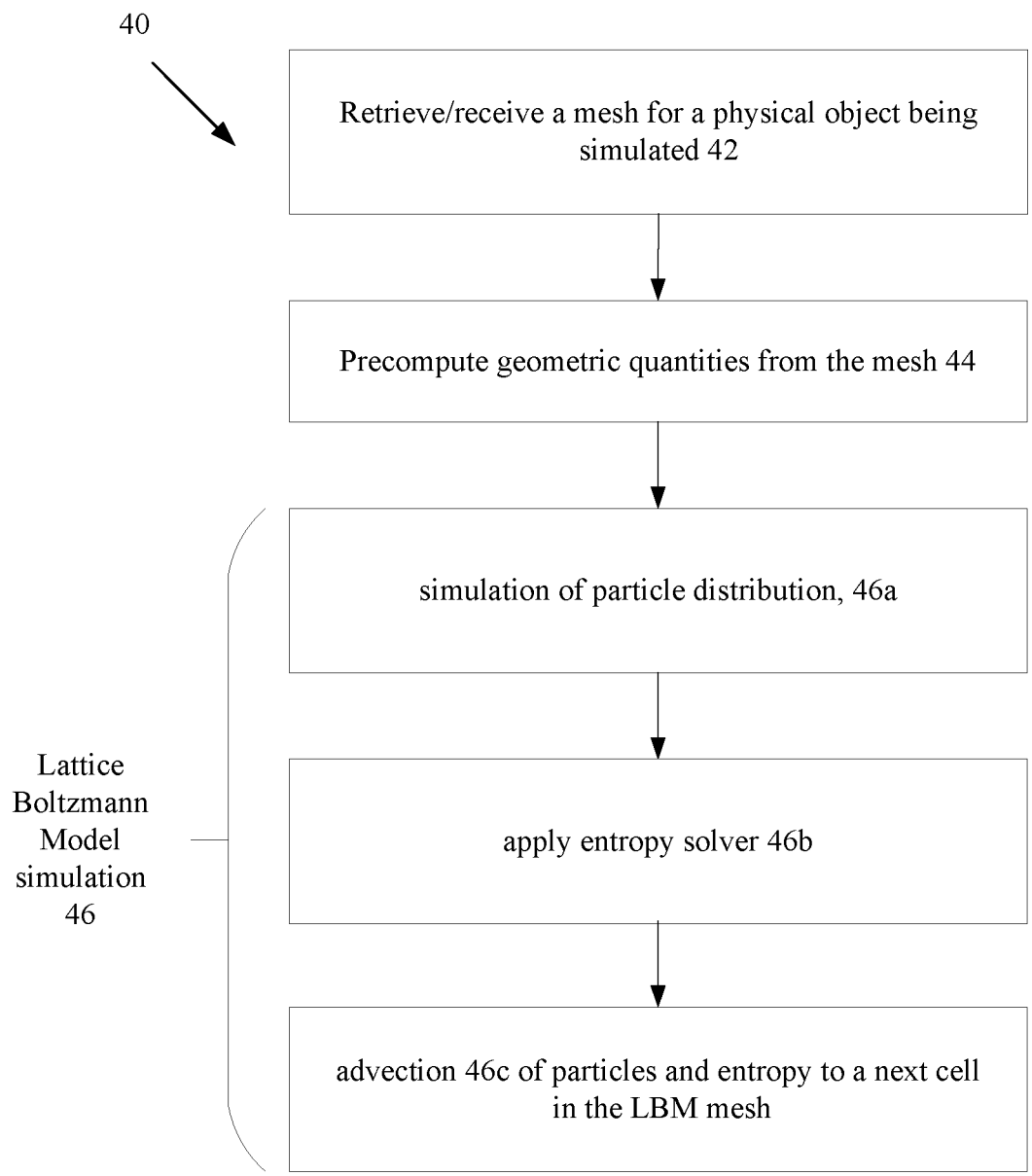
FIG. 2 depicts a flow chart showing operations for formulation of a Lattice Boltzmann Model simulation with the entropy solver.

Referring now to FIG. 2, a process 40 for simulating fluid flow about a representation of a physical object is shown. In the example that will be discussed herein, the physical object is an airfoil. The use of an airfoil is merely illustrative however, as the physical object can be of any shape, and in particular can have planar and/or curved surface(s). The process 40 receives 42, e.g., from client system 14 or retrieves from the data repository 38, a mesh (or grid) for the physical object being simulated. In other embodiments, either an external system or the server 12 based on user input, generates the mesh for the physical object being simulated. The process precomputes 44 geometric quantities from the retrieved mesh and performs dynamic Lattice Boltzmann Model simulation 46 using the precomputed geometric quantities corresponding to the retrieved mesh. Lattice Boltzmann Model simulation includes the simulation 46a of evolution of particle distribution, evaluation 46b of an entropy solver, and advection 46c of particles and entropy to a next cell in the LBM mesh.

Referring to FIG. 3, the simulation process 46 simulates evolution of particle distribution according to a modified lattice Boltzmann equation (LBE), e.g., adapted for the LB-based solver module for high speed flows 34b (FIG. 1). The process 46 (see FIG. 2) performs a collision operation 46a, simulation a time evolution of entropy 46b, followed by an advection 46c of particles to next cells in the LBM space.

Simulating a time evolution of entropy 46b includes collecting 52 an incoming set of distributions from neighboring mesh locations from the collision operation and collecting 54 an additional set of lattice vectors that represents a specific scalar, e.g., entropy, and which is on the flow vector and moves from one grid point to another. Simulating the time evolution of entropy also includes calculating 56 by the computer, a set of scalar values in each location in the mesh. The computer subsequently determines 58 outgoing distributions as a product of the collision operation Eq. 7 and the additional heat source $Q_s$.

The collision operator is stabilized by the computer calculating 60 higher order error terms from incoming lattice set vectors and corresponding average values that are subtracted 62 from the normal collision operator. The additional heat source 64 is added 66 to the second states and is the result of the computer calculating the effect of the additional heat source heating the fluid by fluid viscosity and heating the fluid by fluid conduction. The entropy diffusion is calculated by the computer, and a result of the calculated entropy diffusion is removed 68 from the additional heat source.

Treatment of Heat Source Due to Diffusion

Without any additional heat source, the LBM based scalar solver will result in typical scalar convection-diffusion equation as follows:

$$\frac{\partial(\rho s)}{\partial t} + \nabla \cdot (V\rho s) = \nabla \cdot (k_s \nabla s) \quad \text{(Eq. 10)}$$

where the value $k_s$ depends on the relaxation time used in $\tau_q$. The additional heat source (accounting for the difference between the Eq. 6 and Eq. 10, as given below) will recover correct behavior of the entropy equation.

$$Q_s = -\nabla \cdot (k_s \nabla s) + \left[\frac{\nabla \cdot (k\nabla T) + \Phi}{T}\right] \quad \text{(Eq. 11)}$$

Enhanced Entropy Collision Operator for High Speed Flows

As mentioned in the above mentioned U.S. Pat. No. 9,576,087 a special collision operator for flow states is described. It has wide range of stability and can be applied for high Mach applications.

However, collision operators for entropy become unstable at high Mach number flows.

Chapman-Enskog expansion theory is applied to the evolution of fluid and entropy states (Eq. 1 and Eq. 7) to recover Navier-Stokes equation and the entropy scalar equation. The diffusion term arises due to the collision operation and errors in that could destabilize the entropy solver.

Consider the first order computation of a non-equilibrium component (Eq. 9), in this instance, by using a Taylor series expansion and using basic lattice requirements for LBM the first order non-equilibrium component can be approximated as:

$$\Pi_q^{non-eq} \approx (p\delta + \rho vv) \cdot \nabla[s] \quad \text{(Eq. 12)}$$

In the above expression, a gradient of entropy that is multiplied by pressure ($p\delta$) is the only required component, while the additional term ($\rho vv$), introduces an error. The term ($\rho vv$), is the leading cause of instability in particular for high speed flows as the term is proportional to $Ma^2$ (speed squared).

Modification to the above non-equilibrium computation is made as follows to remove this term.

$$\check{\Pi}_q^{non-eq}\left(\delta - \frac{vv}{RT+v^2}\right) \cdot \Pi_q^{non-eq} \quad \text{(Eq. 13)}$$

The above non-equilibrium component removes the higher order error term and provides an entropy solver that is stable for high speed applications. Substituting Eq. (11) and Eq. (13) into Eq. (7), the complete form of the entropy evolution is given by $$q_i(x + c_i\Delta t, t + \Delta t) = \quad \text{(Eq. 14)}$$
$$q_i^{eq}(x, t) + \left(1 - \frac{1}{\tau_q}\right)\left[\left(\frac{c_i - V}{p}\right) \cdot \left(\delta - \frac{vv}{RT+v^2}\right) \cdot \Pi_q^{non-eq}\right] -$$
$$\nabla \cdot (k_s \nabla s) + \left[\frac{\nabla \cdot (k\nabla T) + \Phi}{T}\right]$$

LB Based Entropy Solver Capabilities

The LB entropy solver discussed above is effective for solving high speed applications that require highly accurate transient results along with compressibility effects. Applications with high temperature ratio also benefits from the LB entropy solver due to enhanced stability offered by its unique collision model.

A benchmark study is presented in this section to show potential advantages of the LB based entropy solver for compressible flows especially pertaining to high speed, variable mesh resolution, complex geometry and high temperature ratio flows. Simulated results are compared against experimental results and typical finite difference FD-based entropy solver.

Referring now to FIGS. 4A and 4B set out are results for simulations carried out for a Jet nozzle flow at Mach 0.901 at a temperature of the jet nozzle that is 2.702 times higher than atmospheric temperature. To predict accurate noise produced by the jet nozzle it is necessary to get more accurate transient results.

FIG. 4A shows pressure oscillation 50a for a FD method and FIG. 4B shows pressure oscillation 50b for the LB based method.

The FD method produces high levels of noise 54a near nozzle 52a exit, which involves complex boundary conditions that affect flow downstream 56a of the jet nozzle 52a due to variable resolutions. The LB based method has a cleaner, i.e., lower noise 54b levels for jet nozzle 52b exit and also preserves fine structures downstream 56b of the nozzle.

Figure 5:
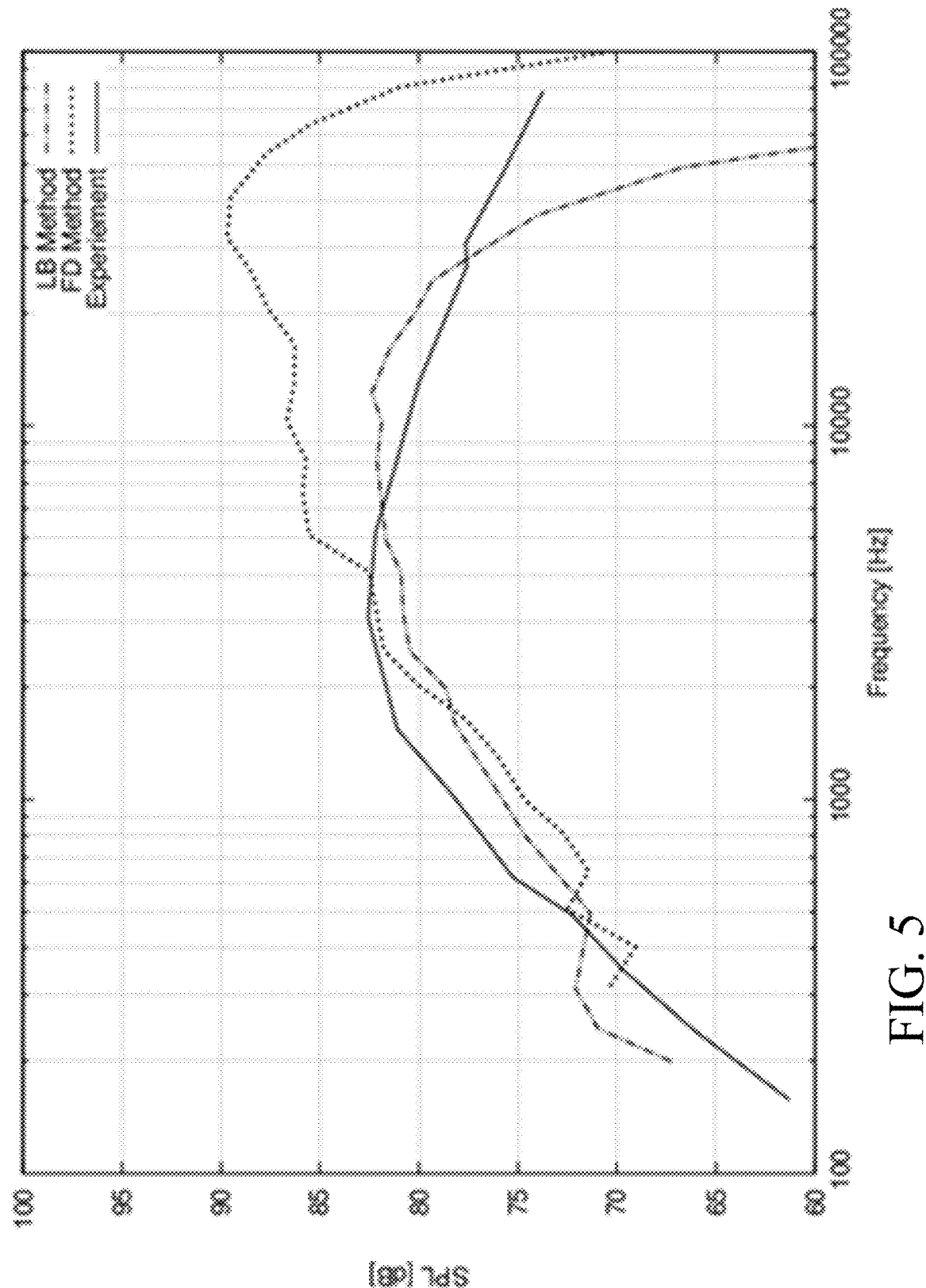
FIG. 5 is a graph of sound pressure level (SPL) vs. frequency.

Referring now to FIG. 5, a graph (of sound pressure level (SPL) in decibels v. frequency in Hz) is depicted. The graph is a comparison of simulated sound pressure levels for FD, and LB method (with entropy solver) to experiment results. The FD method predicts noise levels much higher than the experimental results, especially at frequencies over 1 KHz., because of numerical artifacts, while the LB based method compares relatively well to that of the experimental results.

Figure 6A:
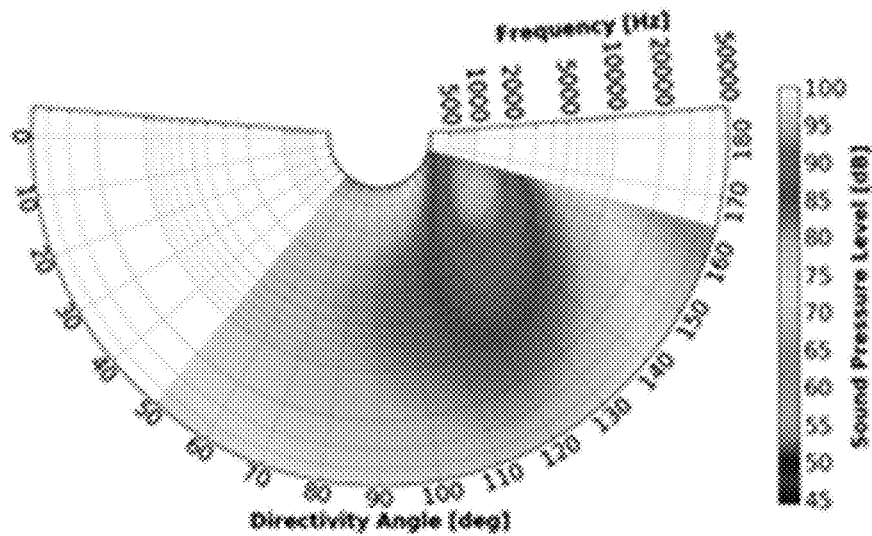
FIGS. 6A-6B are plots of simulated directivity angle vs. frequency and sound pressure level.
Figure 6B:
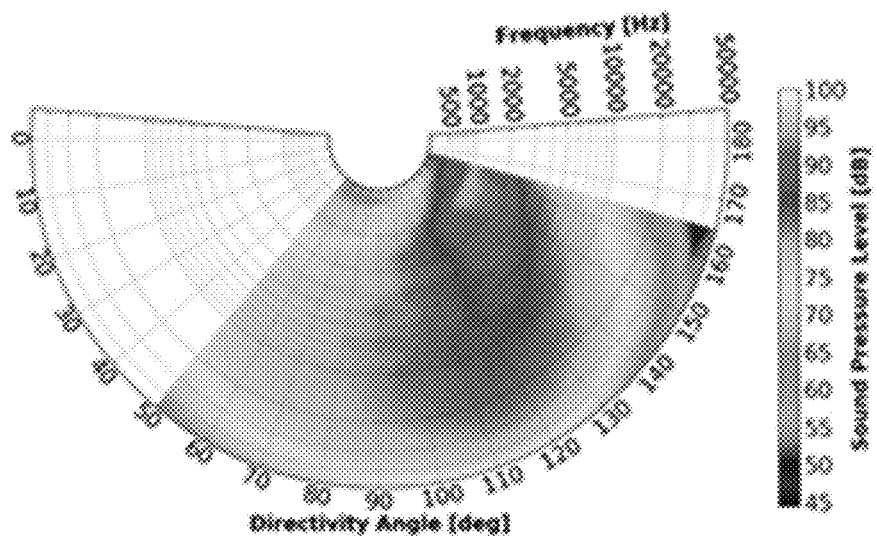

Referring now to FIGS. 6A and 6B, accuracy of the LB based solver in predicting the sound pressure level map in comparison to the experiments is shown.

Figure 7:
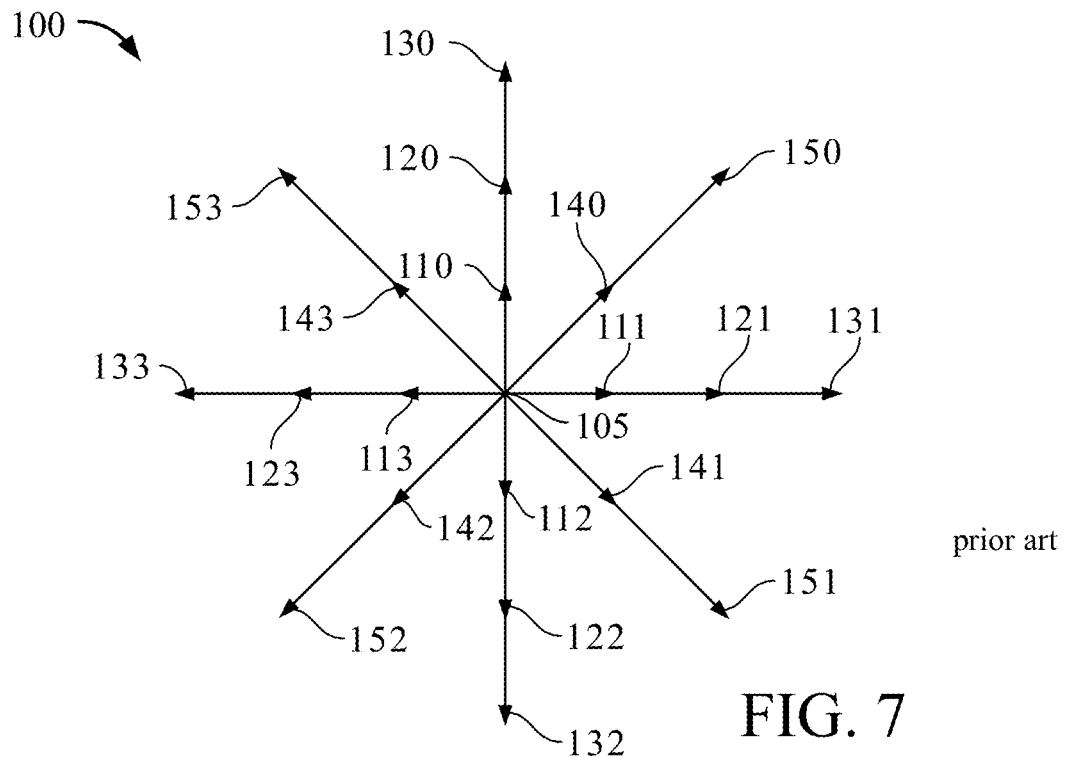
FIGS. 7 and 8 illustrate velocity components of two LBM models represented in Euclidian space (prior art).

Referring to FIG. 7, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 8:
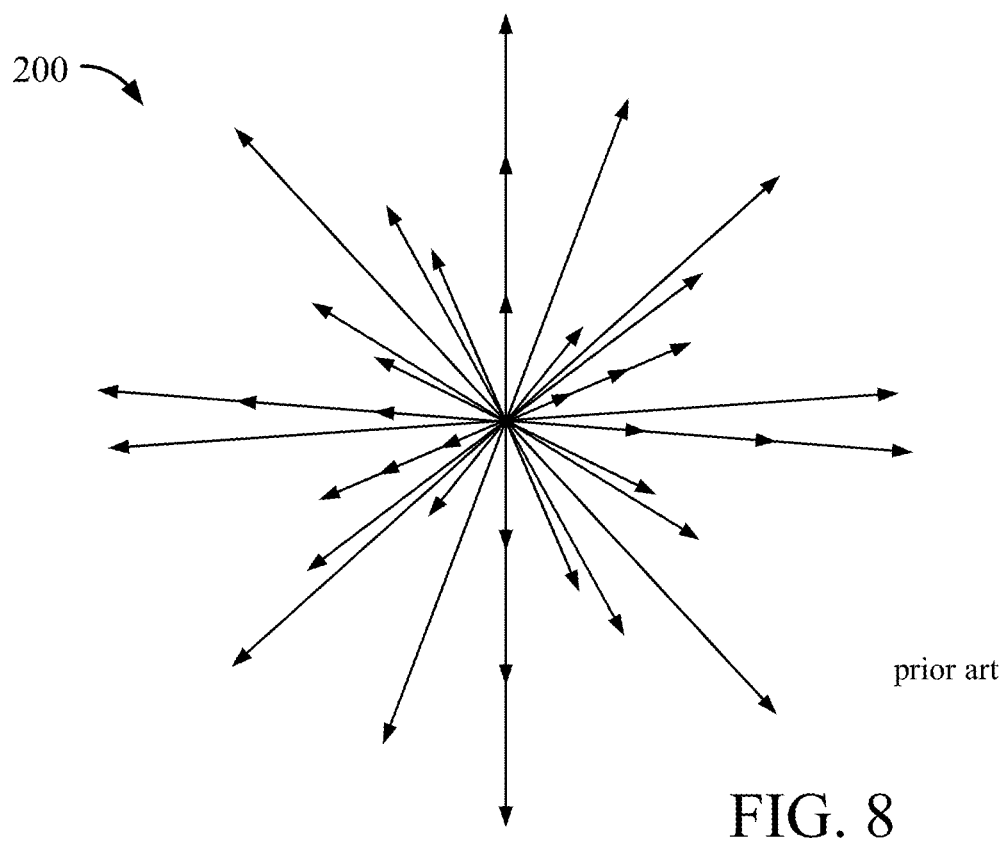

As also illustrated in FIG. 8, a second model (3D-1) 200 is a three-dimensional model that includes 39 velocities, where each velocity is represented by one of the arrowheads of FIG. 6. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with mesh points of Cartesian coordinates (in Euclidian space) in velocity space which facilitates accurate and efficient implementation of discrete velocity models, particularly the kind known as the lattice Boltzmann models. Using such models, flows can be simulated with high fidelity.

Figure 9:
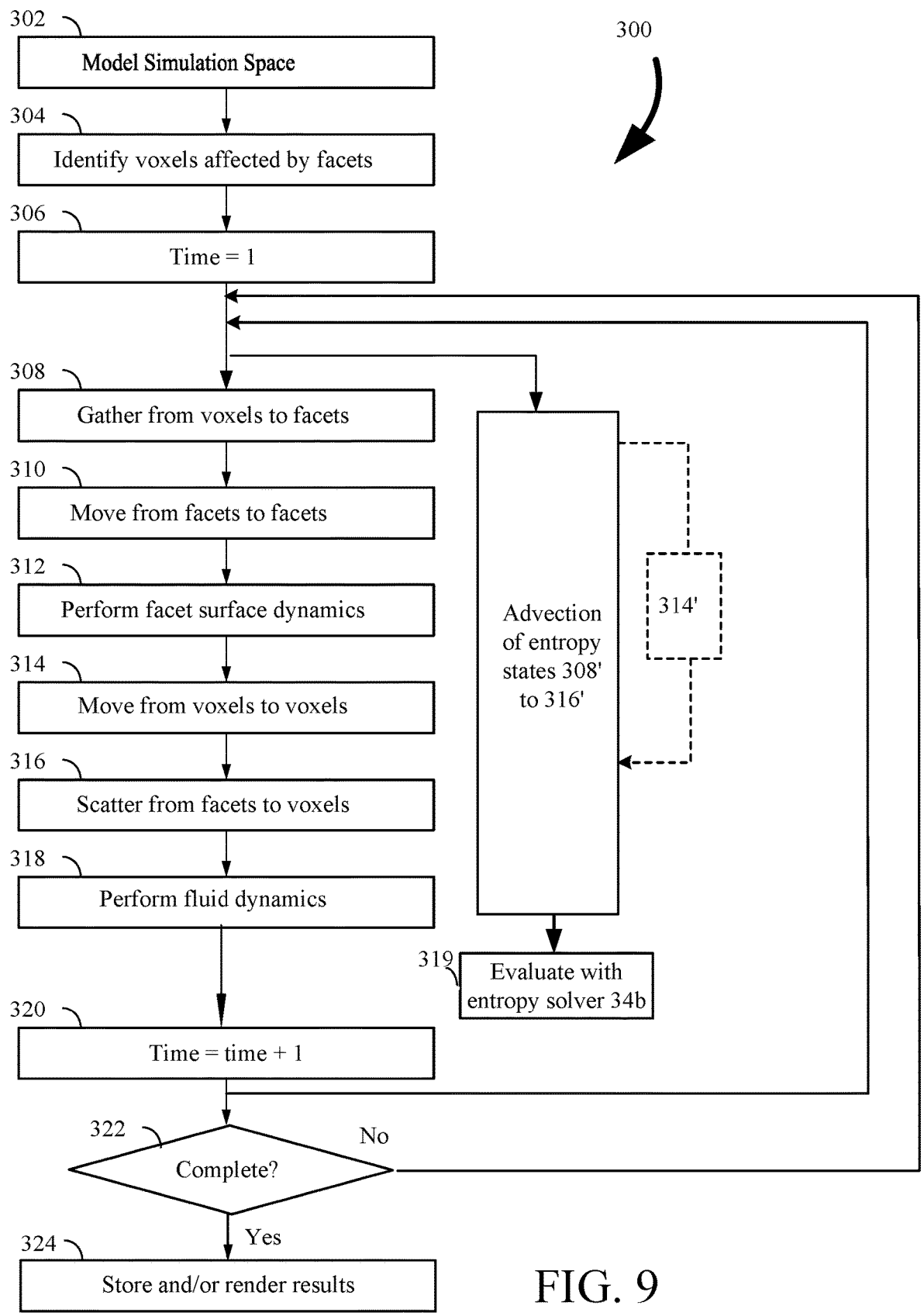
FIG. 9 is a flow chart of a procedure followed by a physical process simulation system.

Referring to FIG. 9, a physical process simulation system operates according to a procedure 300 to simulate a physical process such as fluid flow. Prior to the simulation, a simulation space is modeled as a collection of voxels (302). Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v.\qquad\qquad\text{Eq. (I.5)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{ix}, c_{iy}, c_{iz}). \quad \text{Eq. (I.6)}$$

The energy level zero state represents stopped particles that are not moving in any dimension, i.e. $c_{stopped} = (0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$.

Figure 10:
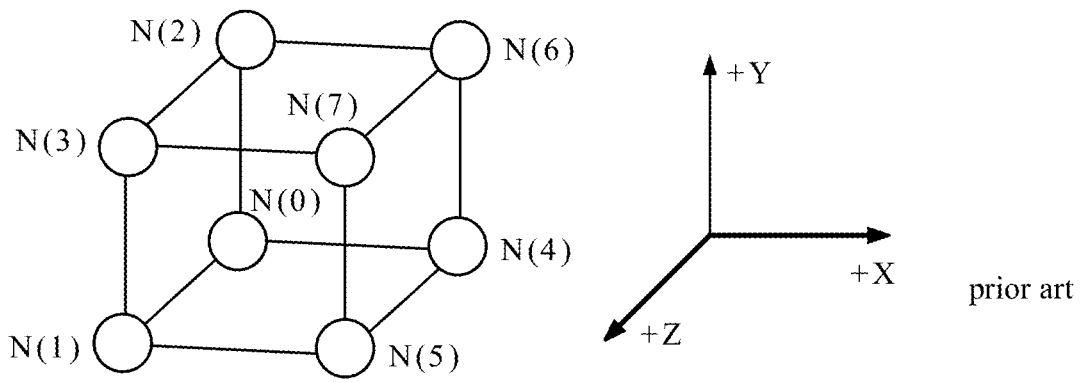
FIG. 10 is a perspective view of a microblock (prior art).

A microblock is illustrated in FIG. 10.

Figure 11A:
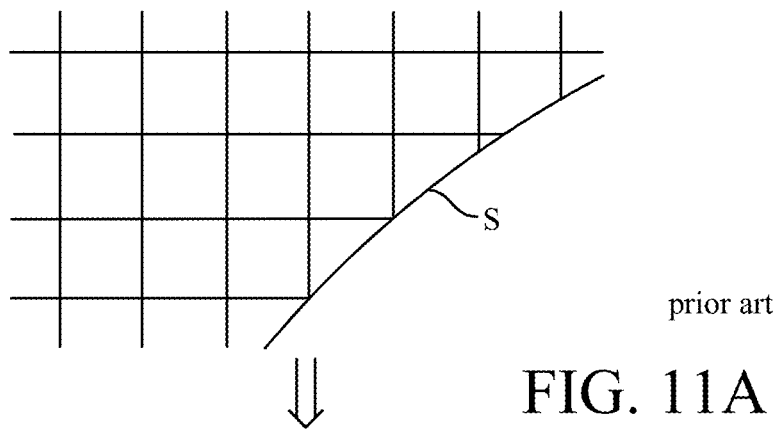
FIGS. 11A-11B are illustrations of lattice structures used by the system of FIG. 1 (prior art).
Figure 11B:
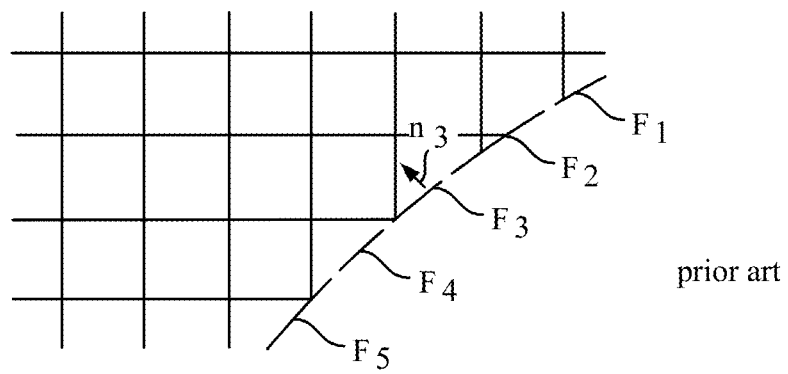

Referring also to FIGS. 11A and 11B, a surface S (FIG. 11A) is represented in the simulation space (FIG. 11B) as a collection of facets $F_\alpha$:

$$S = \{F_\alpha\} \quad \text{Eq. (I.7)}$$

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function $f_i(\alpha)$) that describes the surface dynamic properties of the facet.

Figure 12:
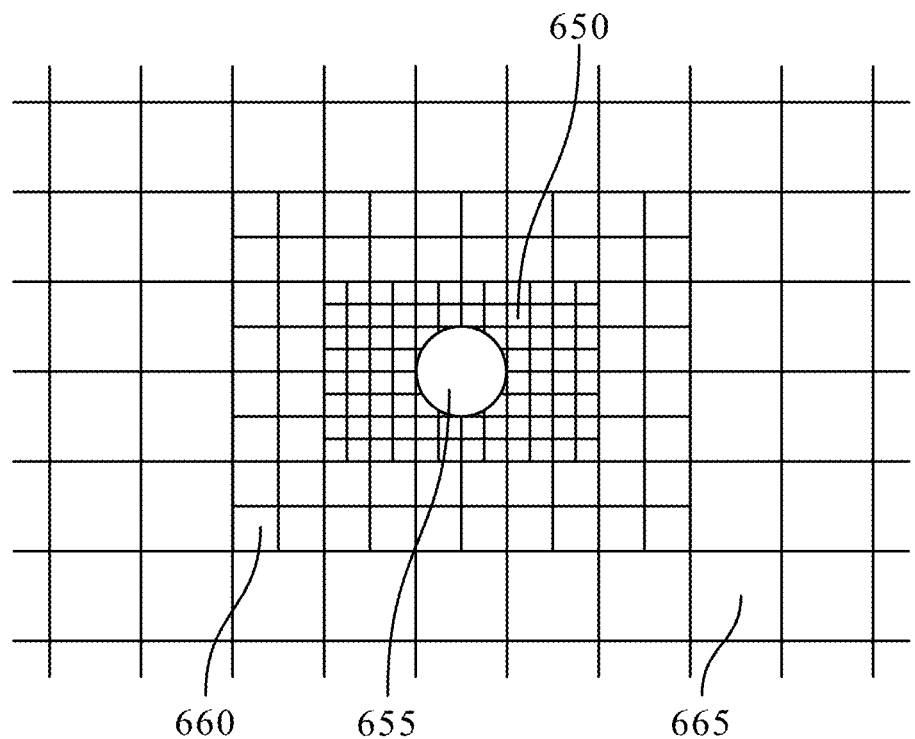
FIGS. 12 and 13 illustrate variable resolution techniques (prior art).

Referring to FIG. 12, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655.

Figure 13:
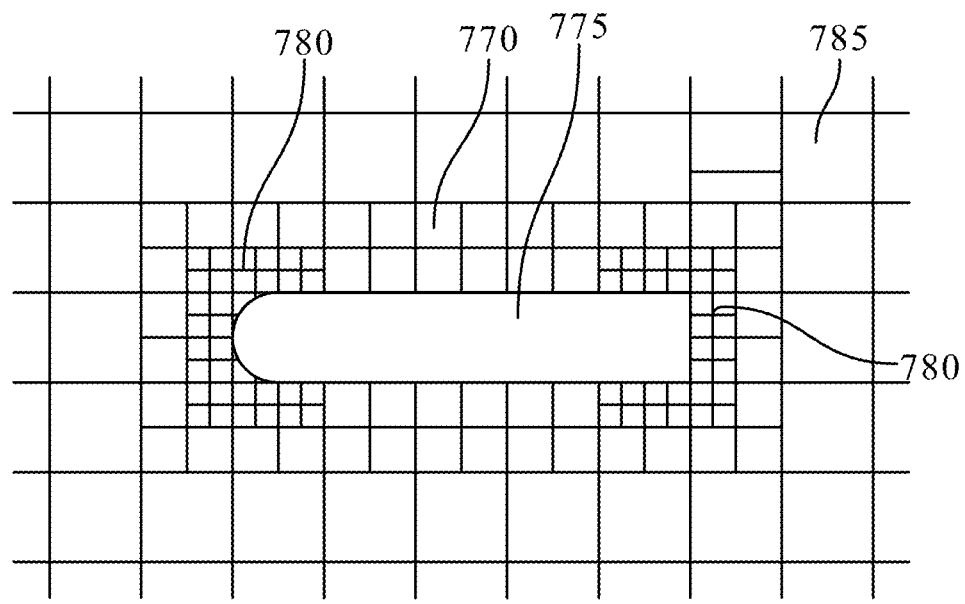

Similarly, as illustrated in FIG. 13, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

Identify Voxels Affected by Facets

Referring again to FIG. 9, once the simulation space has been modeled (302), voxels affected by one or more facets are identified (304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 14:
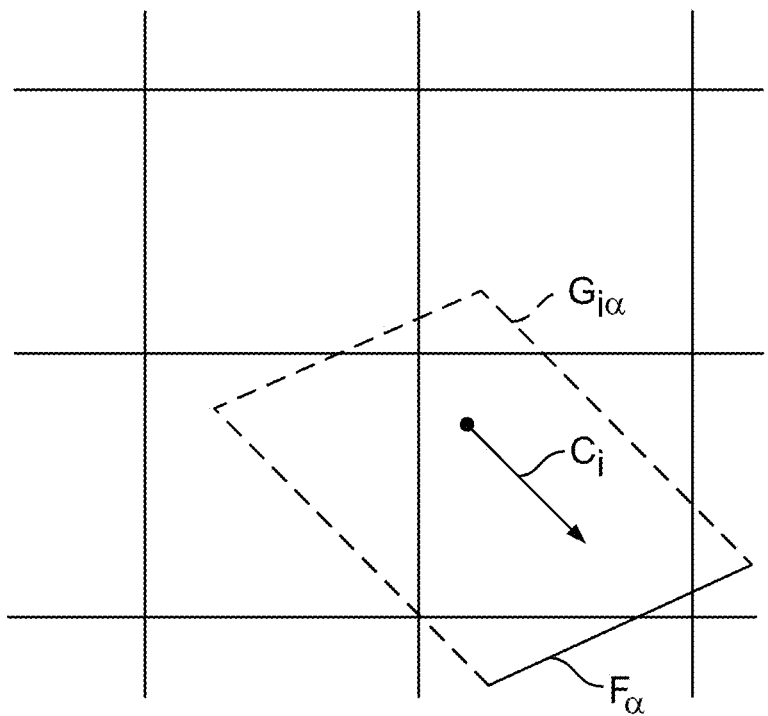
FIG. 14 illustrates movement of particles (prior art).

Referring to FIG. 14, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_i|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha \quad \text{Eq. (I.8)}$$

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x). \quad \text{Eq. (I.9)}$$

When the parallelepiped $G_{i\alpha}$ is intersected by one or more facets, the following condition is true:

$$V_{i\alpha} = \Sigma V_\alpha(x) + \Sigma V_{i\alpha}(\beta) \qquad \text{Eq. (I.10)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \qquad \text{Eq. (I.11)}$$

Perform Simulation

Referring again to FIG. 9, once the voxels that are affected by one or more facets are identified (304), a timer is initialized to begin the simulation (306). During each time increment of the simulation, movement of particles from voxel to voxel (314) is simulated by an advection stage (308-316, which includes 314) that accounts for interactions of the particles with surface facets. Next, a collision stage (318) simulates the interaction of particles within each voxel, based in part on the use of the entropy solver, discussed above. Thereafter, the timer is incremented (320). If the incremented timer does not indicate that the simulation is complete (322), the advection and collision stages (308-320) are repeated. If the incremented timer indicates that the simulation is complete (322), results of the simulation are stored and/or displayed (324).

As shown in FIG. 9 a "parallel path" is used for advection of entropy states. This parallel path generally includes parallel actions 308'-316' followed by the evaluation 319 of the flow with the entropy solver 34b. Entropy states are moved between voxels along the three-dimensional rectilinear lattice 314', similar to 314 for voxel to voxel movement discussed above. The process repeats so long as the incremented timer does not indicate that the simulation is complete (322).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (308). As noted above, the flux of state i particles between a voxel $N(x)$ and a facet $F_\alpha$ is:

$$\Gamma_{i\alpha}(x) = N_i(x) V_{i\alpha}(x) \qquad \text{Eq. (I.12)}$$

From this, for each state i directed toward a facet $F_\alpha$ ($c_i n_\alpha < 0$), the number of particles provided to the facet $F_\alpha$ by the voxels is:

$$\Gamma_{i\alpha V \to F} = \Sigma_x \Gamma_{i\alpha}(x) = \Sigma_x N_i(x) V_{i\alpha}(x) \qquad \text{Eq. (I.13)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(X)$ may have non-integer values, $\Gamma_\alpha(x)$ is stored and processed as a real number.

3. Move from Facet to Facet

Next, particles are moved between facets (310). If the parallelepiped $G_{i\alpha}$ for an incoming state ($c_i n_\alpha < 0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment.

Figure 15:
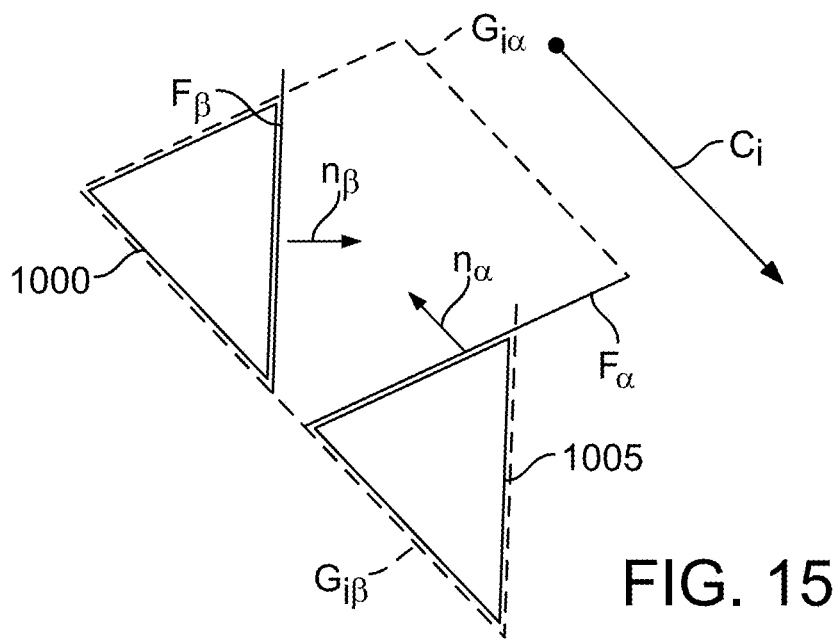
FIG. 15 illustrates regions affected by a facet of a surface (prior art).

This relationship is illustrated in FIG. 15, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta) / V_{i\alpha} \qquad \text{Eq. (I.14)}$$

where $\Gamma_i(\beta, t-1)$ is a measure of the state i particles produced by the facet $F_\beta$ during the previous time increment. From this, for each state i directed toward a facet $F_\alpha$ ($c_i n_\alpha < 0$), the number of particles provided to the facet $F_\alpha$ by the other facets is:

$$\Gamma_{i\alpha F \to F} = \Sigma_\beta \Gamma_{i\alpha}(\beta) = \Sigma_\beta \Gamma_i(\beta, t-1) V_{i\alpha}(\beta) / V_{i\alpha} \qquad \text{Eq. (I.15)}$$

and the total flux of state i particles into the facet is:

$$\Gamma_{iIN}(\alpha) = \Gamma_{i\alpha F \to F} + \Gamma_{i\alpha F \to F} = \Sigma_x N_i(x) V_{i\alpha} + \Sigma_\beta \Gamma_i(\beta, t-1) V_{i\alpha}(\beta) / V_{i\alpha} \qquad \text{Eq. (I.16)}$$

The state vector $N(\alpha)$ for the facet, also referred to as a facet distribution function, has M entries corresponding to the M entries of the voxel states vectors. M is the number of discrete lattice speeds. The input states of the facet distribution function $N(\alpha)$ are set equal to the flux of particles into those states divided by the volume $V_{i\alpha}$:

$$N_i(\alpha) = \Gamma_{iIN}(\alpha) / V_{i\alpha} \qquad \text{Eq. (I.17)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha) / V_{i\alpha} \qquad \text{Eq. (I.18)}$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$)). In an alternative approach, $\Gamma_{iOTHER}(\alpha)$ may be generated using values of $\Gamma_{iOUT}(\alpha)$ from the previous time so that:

$$\Gamma_{iOTHER}(\alpha, t) = \Gamma_{iOUT}(\alpha, t-1). \qquad \text{Eq. (I.19)}$$

For parallel states ($c_i n_\alpha=0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero. The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Next, surface dynamics are performed for each facet to satisfy the four boundary conditions discussed above (312) FIG. 9.

Figure 16:
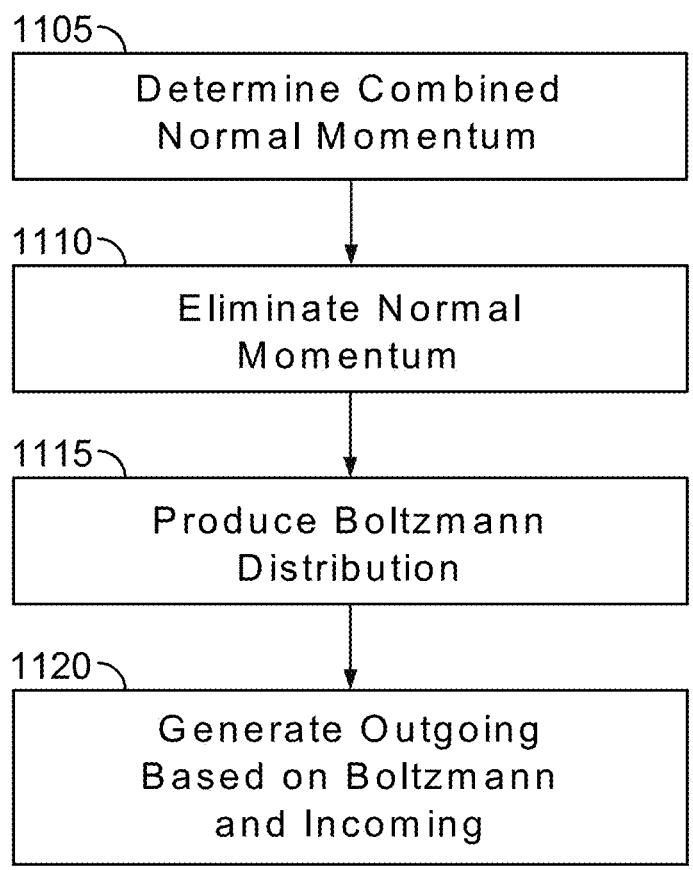
FIG. 16 illustrates a flow chart for surface dynamics (prior art).

A procedure for performing surface dynamics for a facet is illustrated in FIG. 16. Initially, the combined momentum normal to the facet $F_\alpha$ is determined (1105) by determining the combined momentum $P(\alpha)$ of the particles at the facet as:

$$P(\alpha)=\Sigma_i c_i * N_i^\alpha \quad \text{Eq. (I.20)}$$

for all i. From this, the normal momentum $P_n(\alpha)$ is determined as:

$$P_n(\alpha)=n_\alpha \cdot P(\alpha). \quad \text{Eq. (I.21)}$$

This normal momentum is then eliminated using a pushing/pulling technique (1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (1115). As described below with respect to performing fluid dynamics, a Boltzmann distribution may be achieved by applying a set of collision rules to $N_{n-}(\alpha)$.

An outgoing flux distribution for the facet $F_\alpha$ is determined (1120) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha)=\Gamma_{iIN}(\alpha)-N_{n-\beta i}(\alpha)V_{i\alpha} \quad \text{Eq. (I.22)}$$

Using this difference, the outgoing flux distribution is:

$$\Gamma_{iOUT}(\alpha)=N_{n-\beta i}(\alpha)V_{i\alpha}-\Delta\Gamma_{i^*}(\alpha), \quad \text{Eq. (I.23)}$$

for $n_\alpha c_i>0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\Gamma_{iOUT}(\alpha)=N_{n-\beta i}(\alpha)V_{i\alpha}-\Delta\Gamma_{i^*}(\alpha)+C_f(n_\alpha-c_i)-[N_{n-\beta i^*}(\alpha)-N_{n-\beta i}(\alpha)]V_{i\alpha}+(n_\alpha\cdot c_i)(t_{1\alpha}\cdot c_i)\Delta N_{j,i}V_{i\alpha}+(n_\alpha\cdot c_i)(t_{2\alpha}\cdot c_i)\Delta N_{j,2}V_{i\alpha} \quad \text{Eq. (I.24)}$$

for $n_\alpha c_i>0$, where $C_f$ is a function of skin friction, $t_{i\alpha}$ is a first tangential vector that is perpendicular to $n_\alpha$, $t_{2\alpha}$, is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2}=-\frac{1}{2j^2}\left(n_\alpha\sum_i c_i c_i N_{n-Bi}(\alpha)\cdot t_{1,2\alpha}\right) \quad \text{Eq. (I.25)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha)=(P(\alpha)-P_n(\alpha)n_\alpha)/\rho, \quad \text{Eq. (I.26)}$$

where $\rho$ is the density of the facet distribution:

$$\rho=\sum_i N_i(\alpha) \quad \text{Eq. (I.27)}$$

As above, the difference between the incoming flux distribution and the Boltzmann distribution is determined as:

$$\Delta\Gamma_i(\alpha)=\Gamma_{iIN}(\alpha)-N_{n-\beta i}(\alpha)V_{i\alpha} \quad \text{Eq. (I.28)}$$

The outgoing flux distribution then becomes:

$$\Gamma_{iOUT}(\alpha)=N_{n-\beta i}(\alpha)V_{i\alpha}-\Delta\Gamma_{i^*}(\alpha)+C_f(n_\alpha c_i)[N_{n-\beta i^*}(\alpha)-N_{n-\beta i}(\alpha)]V_{i\alpha} \quad \text{Eq. (I.29)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i\cdot n_\alpha>0} c_i\Gamma_{i\alpha OUT} - \sum_{i,c_i\cdot n_\alpha<0} c_i\Gamma_{i\alpha IN} = \rho_\alpha n_\alpha A_\alpha - C_i\rho_\alpha u_i A_\alpha \quad \text{Eq. (I.30)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i,c_{ji}\cdot n_\alpha<0}\Gamma_{\alpha jiIN} - \sum_{i,c_{ji}\cdot n_\alpha>0}\Gamma_{\alpha jiOUT} \quad \text{Eq. (I.31)}$$

where the index j denotes the energy of the state i. This energy difference is then used to generate a difference term:

$$\Delta\Gamma_{\alpha ji} = V_{i\alpha}\Delta\Gamma_{\alpha mj}, \sum_{i,c_{ji}\cdot n_\alpha<0} V_{i\alpha} \quad \text{Eq. (I.32)}$$

for $c_{ji}n_\alpha>0$. This difference term is used to modify the outgoing flux so that the flux becomes:

$\Gamma\alpha_{jiOUTf} = \Gamma_{\alpha jiOUT} + \delta\Gamma\alpha_{ji}$ Eq. (I.33)

for $c_{ji}n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 9, particles are moved between voxels along the three-dimensional rectilinear lattice (314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet.

Figure 17:
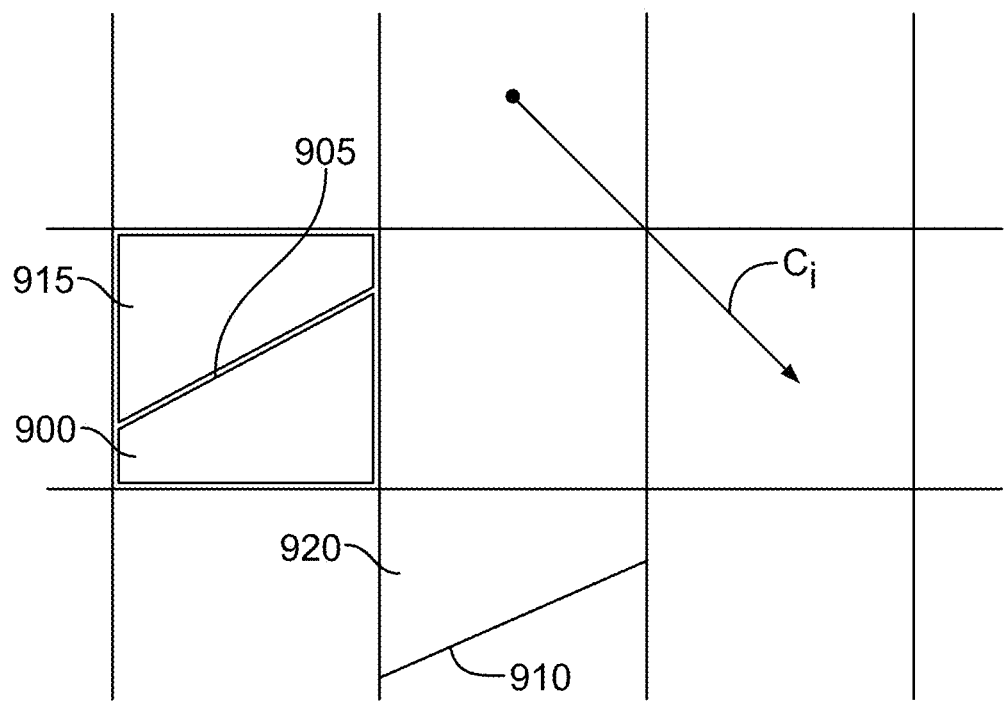
FIG. 17 is a flow chart of a procedure for performing surface dynamics (prior art).

Referring to FIG. 17, when a portion 900 of the state i particles for a voxel 905 is moved to a facet 910 (308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(ƒ) occupied by one or more facets is:

$$N_i(f) = N_i(x)\left(1 - \sum_\alpha V_{i\alpha}(x)\right) \quad \text{Eq. I34}$$

where N(x) is the source voxel.

6. Scatter from Facets to Voxels

Next, the outgoing particles from each facet are scattered to the voxels (316). Essentially, this is the reverse of the gather by which particles were moved from the voxels to the facets. The number of state i particles that move from a facet $F_\alpha$ to a voxel N(x) is:

$$N_{\alpha iF \rightarrow V} = \frac{1}{P_f(x)} V_{i\alpha}(x)\Gamma_{\alpha iOUTf}/V_{\alpha i} \quad \text{Eq. I35}$$

where $P_f(x)$ accounts for the volume reduction of partial voxels. From this, for each state i, the total number of particles directed from the facets to a voxel $N_{(x)}$ is:

$$N_{iF \rightarrow V} = \frac{1}{P_f(x)} \sum_\alpha V_{\alpha i}(x)\Gamma_{\alpha iOUTf}/V_{\alpha i} \quad \text{Eq. I36}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Fluid dynamics are performed (318) FIG. 9. This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation I.1 and Equation I.2. After the advection step, the conserved quantities of a fluid system, specifically the density, momentum and the energy are obtained from the distribution function using Equation I.3. From these quantities, the equilibrium distribution function, noted by $f^{eq}$ in equation (I.2), is fully specified by Equation (I.4). The choice of the velocity vector set $c_i$, the weights, both are listed in Table 1, together with Equation I.2 ensures that the macroscopic behavior obeys the correct hydrodynamic equation.

Figure 18:
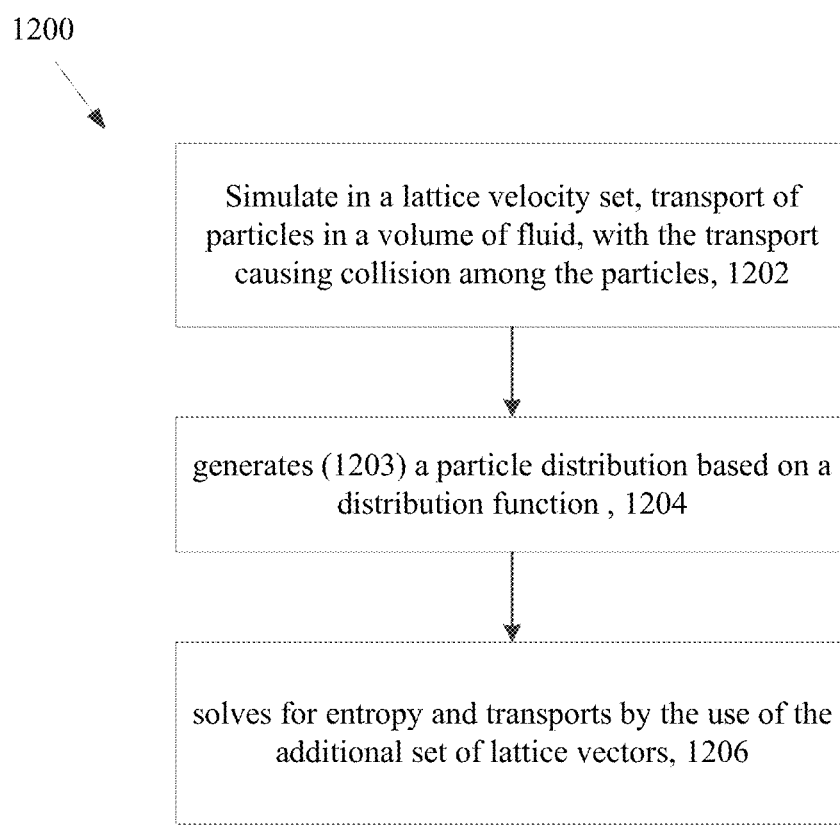
FIG. 18 illustrates movement of particles from a voxel to a surface.

Referring to FIG. 18, the system generates 1200 a distribution of particle transport, in which determination of entropy is separate from collision operations. In this example, the distribution function comprises advection and the entropy determination is included in the distribution portion by augmenting advection with the entropy determination, rather than augmenting particle collision with the entropy determination. Generally, advection includes the transport of particles (e.g., in a horizontal direction from one region to another region).

In operation, the system simulates (1202), in a lattice velocity set, transport of particles in a volume of fluid, with the transport causing collision among the particles. The system also generates (1203) a particle distribution based on a distribution function for transport of the particles, wherein the distribution function comprises a thermodynamic step and a particle collision step, and wherein the thermodynamic step is substantially independent of and separate from the particle collision step.

In the example of FIG. 12, the system also determines (1204) determining a post-collide distribution function $f_i'(x,t)$ for the collision at a particular location x in the volume of fluid at a particular time t, wherein $f_i'(x,t)=f_i(x,t)+C_i(x,t)$, wherein $C_i$ is a collision operator, and $f_i$ is a distribution function for the particles prior to the collision.

The system solves for entropy and transports by the use of the additional set of lattice vectors, $q_i$, to represent the specific entropy, s according to Eq. 7, above 1206. Eq. 7 and to Eq. 1 carry the entropy from one mesh point to another effectively providing entropy as a scalar that is advected along with advection of the fluid flow, as discussed in US Patent Publication US-2016-0188768-A1 for advection of a scalar such as temperature. This technique provides a smooth transition near different mesh levels and near complex boundaries.

Variable Resolution

Variable resolution (as discussed in US 2013/0151221 A1) can also be employed and would use voxels of different sizes, e.g., coarse voxels and fine voxels.

Figure 19:
FIG. 19 is a screen shot representative of a fluid simulation (prior art).

FIG. 19 shows a screenshot of a fluid simulation. A fluid simulation that used the above described entropy solver approach would provide a similar depiction of the fluid simulation as well as any customary corresponding calculated data outputs. However, such a fluid simulation that used the above described entropy solver approach may conduct the fluid simulation faster and or by using less computation resources that other approaches when an object, e.g., an actual physical object, having curvilinear surfaces is modeled and can also be used to model objects in high Mach fluid flows while maintaining a relative stable entropy solver for applications that require highly accurate transient results along with compressibility effects.

Hardware and Software Implementations

System 10 can generally be implemented as any one of a variety of different electrical or electronic computing or processing devices, and can perform any combination of the various steps discussed above to control various components of the disclosed thermal management systems.

System 10 can generally, and optionally, include any one or more of a processor (or multiple processors), a memory, a storage device, and input/output device. Some or all of these components can be interconnected using a system bus, as shown in FIG. 1. The processor is capable of processing instructions for execution. In some embodiments, the processor is a single-threaded processor. In certain embodiments, the processor is a multi-threaded processor. Typically, the processor is capable of processing instructions stored in the memory or on the storage device to display graphical information for a user interface on the input/output device, and to execute the various monitoring and control functions discussed above. Suitable processors for the systems disclosed herein include both general and special purpose microprocessors, and the sole processor or one of multiple processors of any kind of computer or computing device.

The memory stores information within the system, and can be a computer-readable medium, such as a volatile or non-volatile memory. The storage device can be capable of providing mass storage for the System 10. In general, the storage device can include any non-transitory tangible media configured to store computer readable instructions. For example, the storage device can include a computer-readable medium and associated components, including: magnetic disks, such as internal hard disks and removable disks; magneto-optical disks; and optical disks. Storage devices suitable for tangibly embodying computer program instructions and data include all forms of non-volatile memory including by way of example, semiconductor memory devices, such as EPROM, EEPROM, and flash memory devices; magnetic disks such as internal hard disks and removable disks; magneto-optical disks; and CD-ROM and DVD-ROM disks. Processors and memory units of the systems disclosed herein can be supplemented by, or incorporated in, ASICs (application-specific integrated circuits).

The input/output device provides input/output operations for System 10, and can include a keyboard and/or pointing device. In some embodiments, the input/output device includes a display unit for displaying graphical user interfaces and system related information.

The features described herein, including components for performing various measurement, monitoring, control, and communication functions, can be implemented in digital electronic circuitry, or in computer hardware, firmware, or in combinations of them. Methods steps can be implemented in a computer program product tangibly embodied in an information carrier, e.g., in a machine-readable storage device, for execution by a programmable processor (e.g., of System 10), and features can be performed by a programmable processor executing such a program of instructions to perform any of the steps and functions described above. Computer programs suitable for execution by one or more system processors include a set of instructions that can be used directly or indirectly, to cause a processor or other computing device executing the instructions to perform certain activities, including the various steps discussed above.

Computer programs suitable for use with the systems and methods disclosed herein can be written in any form of programming language, including compiled or interpreted languages, and can be deployed in any form, including as stand-alone programs or as modules, components, subroutines, or other units suitable for use in a computing environment.

A number of implementations have been described. Nevertheless, it will be understood that various modifications may be made without departing from the spirit and scope of the claims. Accordingly, other implementations are within the scope of the following claims.

What is claimed is:

1. A method for simulating fluid flow on a computer, with the method comprising:

receiving a model of a simulation space including a mesh represented as a plurality of mesh locations that represents a physical object in the simulation space, with the plurality of mesh locations having appropriate resolutions to account for surfaces of the physical object within the simulation space;

simulating activity of a fluid across the mesh, the activity of the fluid being simulated so as to model collisions of particles of the fluid flow;

storing, in a computer accessible memory, a set of state vectors for each mesh location in the mesh, each of the state vectors comprising a plurality of entries that correspond to particular momentum states of possible momentum states at a corresponding mesh location;

simulating a time evolution of entropy of the fluid flow by:

collecting by a collision operator incoming set of distributions from mesh locations in the mesh from a collision operation;

collecting an additional set of lattice vectors that represent entropy;

calculating by the computer the entropy values in the mesh locations in the mesh;

computing an additional heat source that is added to the additional set of lattice vectors;

determining outgoing distributions as a product of the collision operation and the additional heat source;

calculating by the computer, entropy diffusion;

removing the calculated entropy diffusion from the additional heat source; and modifying the fluid flow, by the computer performing for a time interval, an advection of the particles and entropy to subsequent mesh locations, wherein simulating activity of the fluid and simulating the time evolution of entropy are executed in parallel to improve stability of the simulating.

2. The method of claim 1 wherein simulating activity of the fluid flow comprises:

simulating the fluid flow based in part on a first set of discrete lattice speeds; and the method further comprises:

simulating time evolution of the entropy of the fluid flow based in part on a second set of discrete lattice speeds.

3. The method of claim 2, wherein the second set of discrete lattice speeds are the same lattice speeds as the first set of discrete lattice speeds.

4. The method of claim 1 further comprises:

calculating by the computer, higher order error terms from incoming lattice set vectors;

determining average values of the higher order error terms; and subtracting the average values of the higher order error terms from the collision operator.

5. The method of claim 1, wherein the additional heat source is added to second states, and the method further comprises:

calculating by the computer, the effect of heating by fluid viscosity and heating by fluid conduction.

6. The method of claim 1, further comprises:

calculating by the computer, a set of physical quantities for the mesh locations in the mesh.

7. The method of claim 1, wherein the method is a Lattice Boltzmann method, and includes a Lattice Boltzmann entropy solver that avoids a second order velocity term.

8. The method of claim 1, wherein the collision operation involves a non-equilibrium computation without any second order terms in velocity.

9. The method of claim 1 wherein the additional set of lattice vectors, $q_i$, and the specific entropy, s, and the time evolution of entropy of the fluid flow is given by $$q_i(x + c_i \Delta t, t + \Delta t) = q_i^{eq}(x, t) + \left(1 - \frac{1}{\tau_q}\right)\left[\left(\frac{c_i - V}{p}\right) \cdot \check{\Pi}_q^{non-eq}\right] + Q_{s'},$$

where $q_i$ are lattice vectors, x is direction, $c_i$ is velocity of states, $\Delta t$ is a change in time t, $q_i^{eq}(x, t)$ is lattice vectors at equilibrium, $\tau_q$ is the relaxation time, V is velocity, $\Pi_q^{noneq}$ is the non-equilibrium contribution, p is pressure, and $Q_s$ is the additional heat source.

10. The method of claim 9, wherein the collision operator is an entropy collision operator that is related to:

$$\check{\Pi}_q^{non-eq}\left(\delta - \frac{vv}{RT + v^2}\right) \cdot \Pi_q^{non-eq}.$$

11. A computing system configured to simulate fluid flow, the computing system comprising:

one or more processor devices;

memory operatively coupled to the one or more processor devices, the memory storing computing instructions to cause the one or more processor devices to:

receive a model of a simulation space including a mesh represented as a plurality of mesh locations that represents a physical object in the simulation space, with the plurality of mesh locations having appropriate resolutions to account for surfaces of the physical object within the simulation space;

simulate activity of a fluid across the mesh, the activity of the fluid being simulated so as to model collisions of particles of the fluid flow across the mesh;

store, in the memory, a set of state vectors for each mesh location in the mesh, each of the state vectors comprising a plurality of entries that correspond to particular momentum states of possible momentum states at a corresponding mesh location;

simulate a time evolution of entropy of the fluid flow by instructions to:

collect by a collision operator incoming set of distributions from mesh locations in the mesh from a collision operation;

collect an additional set of lattice vectors that represent entropy;

calculate by the computer the entropy values in each mesh location in the mesh;

compute an additional heat source that is added to the additional set of lattice vectors;

determine outgoing distributions as a product of the collision operation and the additional heat source;

calculate an effect of heating by fluid viscosity and heating by fluid conduction;

calculate entropy diffusion;

remove the calculated entropy diffusion from the additional heat source; and modify the fluid flow by the computer performing for a time interval, an advection of the particles and entropy to subsequent mesh locations, wherein simulating activity of the fluid and simulating the time evolution of entropy are executed in parallel to improve stability of the simulating.

12. The system of claim 11 wherein the instructions to simulate activity of the fluid flow comprises instructions to:

simulate the fluid flow based in part on a first set of discrete lattice speeds; and simulate time evolution of the entropy of the fluid flow based in part on a second set of discrete lattice speeds.

13. The system of claim 12 wherein the second set of discrete lattice speeds are the same lattice speeds as the first set of discrete lattice speeds.

14. The system of claim 11 further comprises instructions to:
calculate higher order error terms from incoming lattice set vectors;
determine average values of the higher order error terms; and
subtract the average values of the higher order error terms from the collision operator.

15. The system of claim 11 wherein the additional heat source is computed and added to second states, and the system-further comprises instructions to:
calculate the effect of heating by fluid viscosity and heating by fluid conduction.

16. The system of claim 11, further comprises instructions to:
calculate a set of physical quantities for the mesh locations in the mesh.

17. The system of claim 11 wherein the entropy solver is a Lattice Boltzmann entropy solver that avoids a second order velocity term.

18. The system of claim 11 wherein the collision operation involves a non-equilibrium computation without any second order terms in velocity.

19. The system of claim 11 wherein the
additional set of lattice vectors, $q_i$, and the specific entropy, s, and the time evolution of entropy of the fluid flow is given by $$q_i(x + c_i \Delta t, t + \Delta t) = q_i^{eq}(x, t) + \left(1 - \frac{1}{\tau_q}\right)\left[\left(\frac{c_i - V}{p}\right) \cdot \check{\Pi}_q^{non-eq}\right] + Q_s,$$

where $q_i$ are lattice vectors, x is direction, $c_i$ is velocity of states, $\Delta t$ is a change in time t, $q_i^{eq}(x, t)$ is lattice vectors at equilibrium, $\tau_q$ is the relaxation time, V is velocity, $\Pi_q^{noneq}$ is the non-equilibrium contribution, p is pressure, and $Q_s$ is the additional heat source.

20. The system of claim 19, wherein the collision operator is an entropy collision operator that is related to:

$$\check{\Pi}_q^{non-eq}\left(\delta - \frac{vv}{RT + v^2}\right) \cdot \Pi_q^{non-eq}.$$

21. A computer program product tangibly stored on a non-transitory hardware storage device, the computer program product including executable instructions to configure a computing system to:
receive a model of a simulation space including a mesh represented as a plurality of mesh locations that represents a physical object in the simulation space, with the plurality of mesh locations having appropriate resolutions to account for surfaces of the physical object within the simulation space;
simulate activity of a fluid flow across the mesh, the activity of the fluid flow being simulated so as to model collisions of particles of the fluid flow;
store, in the memory, a set of state vectors for each mesh location in the mesh, each of the state vectors comprising a plurality of entries that correspond to particular momentum states of possible momentum states at a corresponding mesh location;
simulate a time evolution of entropy of the fluid flow by instructions to:
collect by a collision operator incoming set of distributions from neighboring mesh locations in the mesh from a collision operation;
collect an additional set of lattice vectors that represent entropy;
calculate the entropy values in each mesh location in the mesh;
compute an additional heat source that is added to the additional set of lattice vectors;
determine outgoing distributions as a product of the collision operation and the additional heat source;
calculate an effect of heating by fluid viscosity and heating by fluid conduction;
calculate entropy diffusion;
remove the calculated entropy diffusion from the additional heat source; and
modify the fluid flow by performing for a time interval, an advection of the particles and entropy to subsequent mesh locations,
wherein simulating activity of the fluid and simulating the time evolution of entropy are executed in parallel to improve stability of the simulating.

22. The method of claim 1, further comprising simulating sound pressure levels of the fluid flow, wherein the fluid flow comprises a high speed, compressible fluid flow through a nozzle.

23. The computer program product of claim 21, wherein the instructions to simulate the time evolution of entropy comprise a Lattice Boltzmann method and includes a Lattice Boltzmann entropy solver that avoids a second order velocity term.

24. The computer program product of claim 21, wherein the collision operation involves a non-equilibrium computation without any second order terms in velocity.

25. The computer program product of claim 21, wherein the additional set of lattice vectors, $q_i$, and the specific entropy, s, and the time evolution of entropy of the fluid flow is given by $$q_i(x + c_i \Delta t, t + \Delta t) = q_i^{eq}(x, t) + \left(1 - \frac{1}{\tau_q}\right)\left[\left(\frac{c_i - v}{p}\right) \cdot \check{\Pi}_q^{non-eq}\right] + Q_s,$$

where $q_i$ are lattice vectors, x is direction, $c_i$ is velocity of states, $\Delta t$ is a change in time t, $q_i^{eq}(x, t)$ is lattice vectors at equilibrium, $\tau_q$ is the relaxation time, V is velocity, $\Pi_q^{noneq}$ is the non-equilibrium contribution, p is pressure, and $Q_s$ is the additional heat source.

26. The computer program product of claim 25, wherein the collision operator is an entropy collision operator that is related to:

$$\check{\Pi}_q^{non-eq} = \left(\delta - \frac{vv}{RT + v^2}\right) \cdot \Pi_q^{non-eq}.$$

\* \* \* \* \*